US012725413B2

(12) United States Patent
Wasim et al.

(10) Patent No.: US 12,725,413 B2
(45) Date of Patent: Sep. 1, 2026

(54) SYSTEM AND METHOD FOR MODELING LOCAL AND GLOBAL SPATIO-TEMPORAL CONTEXT IN VIDEO FOR VIDEO RECOGNITION

(71) Applicant: Mohamed bin Zayed University of Artificial Intelligence, Abu Dhabi (AE)

(72) Inventors: Syed Talal Wasim, Abu Dhabi (AE); Muhammad Uzair Khattak, Abu Dhabi (AE); Muzammal Naseer, Abu Dhabi (AE); Salman Khan, Abu Dhabi (AE); Fahad Shahbaz Khan, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 420 days.

(21) Appl. No.: 18/411,928

(22) Filed: Jan. 12, 2024

(65) Prior Publication Data

US 2025/0232583 A1 Jul. 17, 2025

(51) Int. Cl.
*G06V 20/50* (2022.01)
*G06V 10/77* (2022.01)
*G06V 20/40* (2022.01)

(52) U.S. Cl.
CPC .......... *G06V 20/41* (2022.01); *G06V 10/7715* (2022.01); *G06V 20/50* (2022.01)

(58) Field of Classification Search
CPC ..... G06V 20/41; G06V 20/50; G06V 10/7715
(Continued)

(56) References Cited

U.S. PATENT DOCUMENTS 11,361,546 B2 * 6/2022 Carreira ................. G06N 3/084
2021/0248761 A1 * 8/2021 Liu .......................... G06N 3/08

FOREIGN PATENT DOCUMENTS

WO 2022/111506 A1 6/2022

OTHER PUBLICATIONS

Li, L., Kong, T., Sun, F., Liu, H. (2019). Deep Point-Wise Prediction for Action Temporal Proposal. In: Gedeon, T., Wong, K., Lee, M. (eds) Neural Information Processing. ICONIP 2019. Lecture Notes in Computer Science( ), vol. 11955. Springer, Cham. https://doi.org/10.1007/978-3-030-36718-3_40 (Year: 2019).*

(Continued)

*Primary Examiner* — Jennifer Mehmood
*Assistant Examiner* — Eric James Shoemaker
(74) *Attorney, Agent, or Firm* — Oblon, McClelland, Maier & Neustadt, L.L.P.

(57) ABSTRACT

A system and a method for modeling local and global spatio-temporal context in a video for video recognition includes obtaining an input feature map and transforming the input feature map using linear functions to generate a spatial feature map and a temporal feature map corresponding to a video. The method further includes generating hierarchical contextual feature maps based on the spatial feature map and the temporal feature map that represent a context of the video at multiple levels of granularity. The method further includes aggregating the hierarchical contextual feature maps based on gating weights to obtain a spatial modulator and a temporal modulator that are representative of an aggregated context across the multiple levels. The method further includes obtaining an output spatio-temporal feature map based on the spatial modulator, the temporal modulator, and a query token associated with the video.

20 Claims, 20 Drawing Sheets

(58) Field of Classification Search
USPC .......................................................... 382/159
See application file for complete search history.

(56) References Cited

OTHER PUBLICATIONS

Z. Wei et al., “DMFormer: Closing the gap Between CNN and Vision Transformers,” ICASSP 2023—2023 IEEE International Conference on Acoustics, Speech and Signal Processing (ICASSP), Rhodes Island, Greece, 2023, pp. 1-5, doi: 10.1109/ICASSP49357.2023.10097256. (Year: 2023).*

Jianwei Yang, Chunyuan Li, Xiyang Dai, Lu Yuan, Jianfeng Gao. Focal Modulation Networks. 36th Conference on Neural Information Processing Systems. arXiv:2203.11926. (Year: 2022).*

Syed Talal Wasim, Muhammad Uzair Khattak, Muzammal Naseer, Salman Khan, Mubarak Shah, Fahad Shahbaz Khan. Video-FocalNets: Spatio-Temporal Focal Modulation for Video Action Recognition. arXiv:2307.06947v4. (Year: 2023).*

Fazry et al. ; Change Detection of High-Resolution Remote Sensing Images Through Adaptive Focal Modulation on Hierarchical Feature Maps ; IEEEAccess vol. 11 ; Jul. 5, 2023 ; 19 Pages.

Chen et al. ; Space-time video super-resolution using long-term temporal feature aggregation ; Autonomous Intelligent Systems ; 2023 ; 9 Pages.

Yang et al. ; A Spatio-Temporal Motion Network for Action Recognition Based on Spatial Attention ; MDPI Entropy, 24 ; Mar. 4, 2022 ; 19 Pages.

* cited by examiner 500
518
516
xL
Temporal Focal Modulation
xL
Spatial Focal Modulation
1
2
514
N 500
512
510
Temporal Averaging
xL
Factor 3D Conv Focal Modulation
1
2
508
N 500
506
504
Temporal Averaging
xL
Spatial Focal Modulation
1
2
502
N 500
xL
Temporal Focal Modulation
Spatial Focal Modulation
520
1
2
N
524
522

SYSTEM AND METHOD FOR MODELING LOCAL AND GLOBAL SPATIO-TEMPORAL CONTEXT IN VIDEO FOR VIDEO RECOGNITION

BACKGROUND

Technical Field

The present disclosure is directed to the technical field of video processing. More particularly, the present disclosure relates to a system and a method for modeling local and global spatio-temporal context in a video for video recognition.

Description of Related Art

A video recognition is a process that analyzes, obtains, and processes data from a visual source, such as a video. Video recognition models utilize transformer models for long-range spatio-temporal context modeling. Video transformer designs are based on self-attention that can model global context at a high computational cost. In comparison, convolutional designs for videos offer an efficient alternative but lack long-range dependency modeling.

Video recognition methods known in the art have been significantly influence by Convolutional Neural Networks (CNNs). Initially 2D and later 3D CNNs achieved better performance on both small-scale and large-scale video recognition benchmarks. With their local connectivity and translational equivariance properties, CNNs have a better inductive bias especially useful for learning on small datasets. On the other hand, Vision Transformers (ViTs) offer long-range context modeling and found to have been quite effective for image classification and video recognition. ViTs are based on the self-attention mechanism originally proposed in Natural Language Processing that encodes minimal inductive biases and can model both short and long range dependencies. This feature allows ViTs to better generalize to large datasets, as shown by recent results on major video recognition bench-marks where they have out-performed their CNN counterparts.

Several other methods have also been proposed in the art. For example, WO2022111506A1 discloses a neural network based on video action recognition method. The video recognition is performed based on a differential image information obtained using differential processing on an image frame. However, the method involves a complex procedure.

A method of detecting changes between two images using the FocalNet architecture was proposed. (See: L. Fazry, M. M. L. Ramadhan and W. Jatmiko, "*Change Detection of High-Resolution Remote Sensing Images Through Adaptive Focal Modulation on Hierarchical Feature Maps*", IEEE Access, vol. 11, pp. 69072-69090, 2023, doi: 10.1109/ACCESS.2023.3292531). However, the reference does not disclose the method for video recognition.

An ML-based reconstruction of high-resolution high-frame-rate videos from their low-resolution low-frame-rate counterparts was disclosed. (See: Chen, K., Yue, Z. & Shi, M., "*Space-time video super-resolution using long-term temporal feature aggregation*", Auton. Intell. Syst. 3, 5 (2023), doi: 10.1007/s43684-023-00051-9). The reference uses long-term temporal feature aggregation network (LTFA-Net) for reconstructing high-resolution video. However, modeling global and local context for reconstruction of high-resolution video involves a complex method and is time consuming.

A spatio-temporal motion network (SMNet) for action recognition in videos based on spatial attention was disclosed. (See: Yang, Q.; Lu, T.; Zhou, H. A "*Spatio-Temporal Motion Network for Action Recognition Based on Spatial Attention*", Entropy 2022, 24, 368. https://doi.org/10.3390/e24030368). However, the technique used in recognizing actions in the video based on spatial attention involves a complex procedure.

Each method in the art has one or more limitations hindering their adoption. For example, the methods including CNNs are limited in their ability to model long-range dependencies due to their limited receptive field. Accordingly, although, CNNs are more efficient and suited for short-range information modeling, they are limited in their representation learning capabilities for long-range dependencies and larger datasets. On the other hand, ViTs resolve these issues but at increased parametric complexity and high computational cost. The high complexity originates from the dual-step self-attention operation that first performs a query-key interaction, followed by an aggregation over the context values. The query-key interaction requires the computationally expensive step of calculating token-to-token attention scores via dot-product since the queries and keys do not contain information about the surrounding context. Few focus areas of attention maps in ViT are less meaningful and may highlight some spuriously correlated regions. Moreover, ViTs come at a high computational and parameter cost. Other proposed methods are either complex or consume a significant amount of time in performing the computation. Also, most of the method proposed in the art demonstrate a trade-off between efficiency and performance.

Since video recognition necessitates accurate modeling of both short-range and long-range spatio-temporal dependencies for high performance, there is a need for a system or method to optimize efficiency and performance while accurately capturing both local and global contexts in videos without involving complex procedures. Additionally, it should accurately model short-range and long-range spatio-temporal dependencies, thereby overcoming limitations encountered in prior art studies.

SUMMARY

In an exemplary embodiment, a method for modeling a local and a global spatio-temporal context in a video for video recognition is disclosed. The method includes obtaining an input feature map corresponding to a video and transforming the input feature map using linear functions to generate a spatial feature map and a temporal feature map. The spatial feature map is representative of intra-frame features in a frame of the video and the temporal feature map is representative of inter-frame features across frames of the video. The method further includes generating hierarchical contextual feature maps for the spatial feature map and the temporal feature map by applying depth-wise convolutions at multiple levels to the spatial feature map to generate a level-specific spatial feature map for each level, and point-wise convolutions at multiple levels to the temporal feature map to generate a level-specific temporal feature map for each level. The method further includes aggregating the hierarchical contextual feature maps by aggregating the level-specific spatial feature map for the multiple levels using a first set of gating weights to obtain a spatial modulator, and aggregating the level-specific temporal feature map for the multiple levels using a second set of gating weights to obtain a temporal modulator. The method further includes obtaining an output spatio-temporal feature map based on the spatial modulator, the temporal modulator, and a query token associated with the video.

In another exemplary embodiment, a method for modeling local and global spatio-temporal context in a video for video recognition is disclosed. The method includes obtaining a spatial feature map and a temporal feature map for a video. The method further includes generating hierarchical contextual feature maps based on the spatial feature map and the temporal feature map that represent a context of the video at multiple levels of granularity. The method further includes aggregating the hierarchical contextual feature maps based on gating weights to obtain a spatial modulator and a temporal modulator that are representative of an aggregated context across the multiple levels. The method further includes obtaining an output spatio-temporal feature map based on the spatial modulator, the temporal modulator and a query token associated with the video.

In another exemplary embodiment, a system comprising a memory storing set of instructions and a processor configured to execute the set of instructions to cause the system to perform a method is disclosed. The method includes obtaining a spatial feature map and a temporal feature map for a video. The method further includes generating hierarchical contextual feature maps based on the spatial feature map and the temporal feature map that represent a context of the video at multiple levels of granularity. The method further includes aggregating the hierarchical contextual feature maps based on gating weights to obtain a spatial modulator and a temporal modulator that are representative of an aggregated context across the multiple levels. The method further includes obtaining an output spatio-temporal feature map based on the spatial modulator, the temporal modulator and a query token associated with the video The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
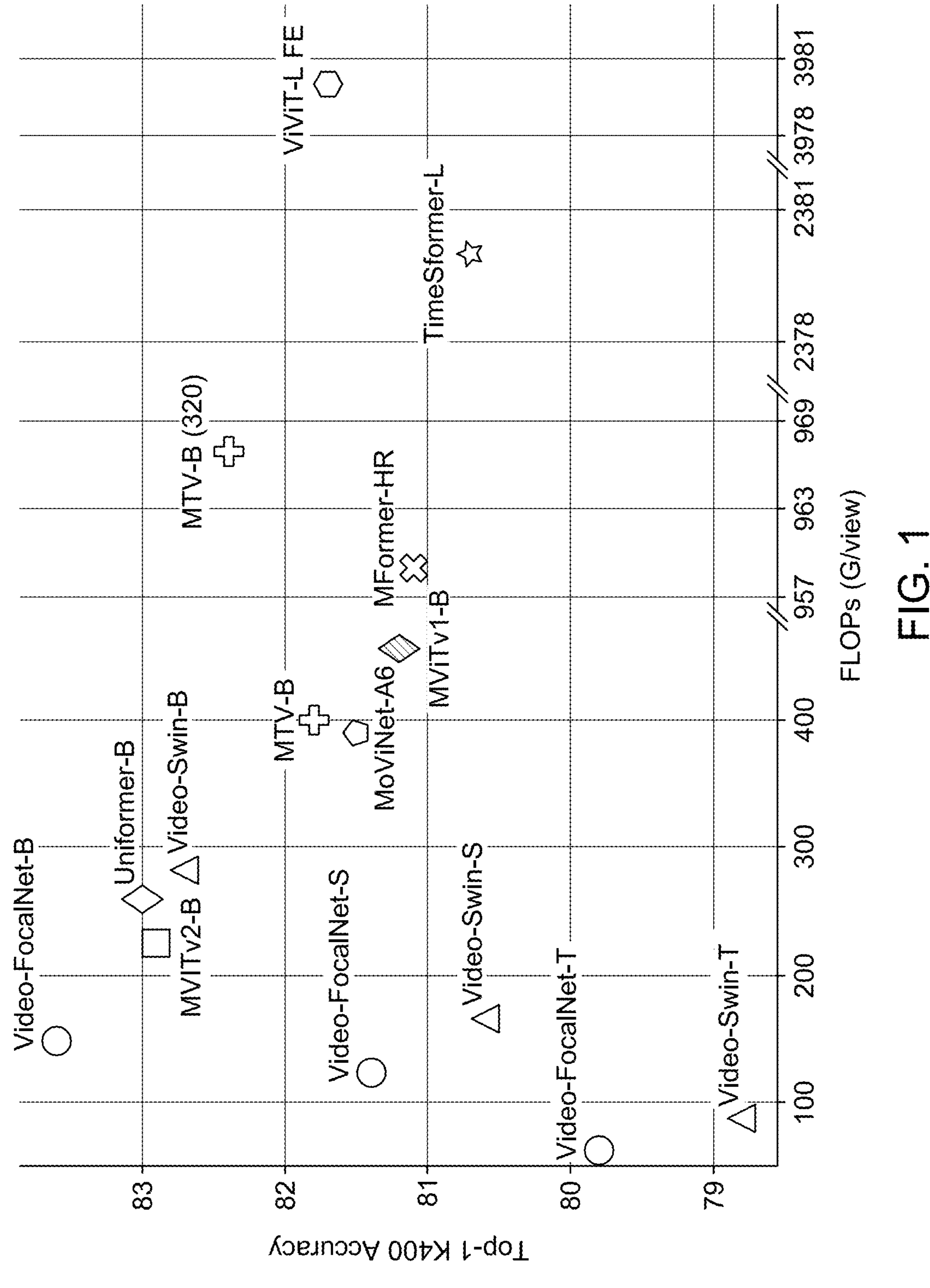
FIG. 1 illustrates a graph of accuracy versus computational complexity trade-off comparison between plurality of action recognition methods known in the art and the current invention (Video-FocalNet), according to certain embodiments.

In the drawings, like reference numerals designate identical or corresponding parts throughout the several views. Further, as used herein, the words “a”, “an” and the like generally carry a meaning of “one or more”, unless stated otherwise. Furthermore, the terms “approximately,” “approximate”, “about” and similar terms generally refer to ranges that include the identified value within a margin of 20%, 10%, or preferably 5%, and any values therebetween.

Further, the terms “l”, “L” and “1” represent same terms and used throughout the disclosure synonymously.

Aspects of this disclosure are directed to a system, and a method for modeling local and global spatio-temporal context in a video for video recognition. The method discloses an effective and efficient architecture for video recognition that includes a spatio-temporal focal modulation architecture configured to reverses the steps of the self-attention operation for better efficiency. The spatio-temporal focal modulation architecture is inspired by focal modulation for image recognition and extends it to videos by independently aggregating the surrounding spatial and temporal context for each token into spatial and temporal modulators, followed by fusing them with the queries in the interaction step. The aggregation is based on a hierarchical contextualization step using a stack of depth wise and pointwise convolutions for the spatial and temporal branches, respectively, followed by a gated aggregation that enables modeling both short- and long-range dependencies. The aggregation step is based on depth wise as well as point wise convolutions, whereas the interaction step is based on element-wise multiplication. Aggregation and interaction step, both are computationally less expensive than their self-attention counterparts that is, query-key interactions and query-value aggregation via matrix multiplications. A graph 100 of accuracy versus computational complexity trade-off comparison between plurality of action recognition methods known in the art and the current invention (Video-FocalNet) is illustrated in FIG. 1, according to an embodiment. The accuracy is compared on the Kinetics-400 dataset against GFLOPs/view. The current invention shows an optimal trade-off between performance and computation cost as illustrated in FIG. 1.

Figure 2:
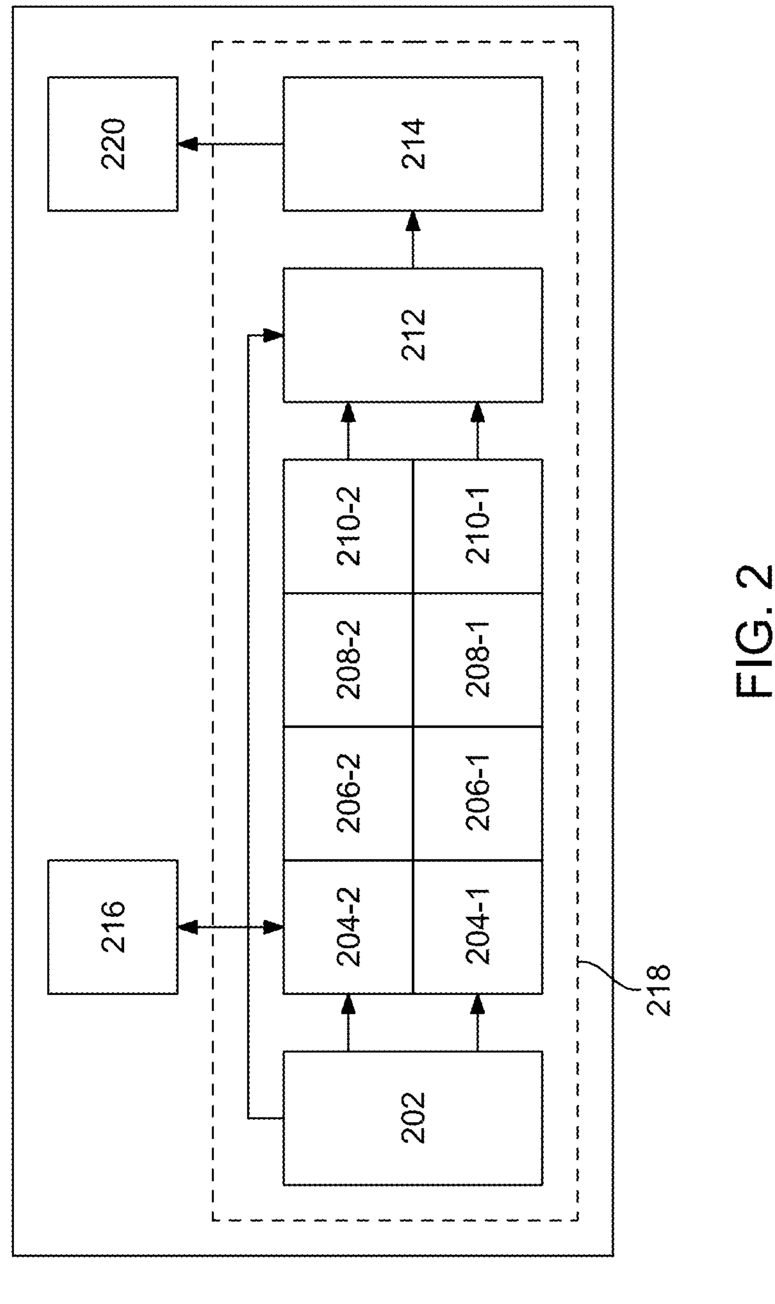
FIG. 2 illustrates a block diagram of a system configured to model local and global spatio-temporal context in a video for video recognition, according to certain embodiments.

FIG. 2 illustrates a block diagram of a system 200 configured to model local and global spatio-temporal context in a video for video recognition, according to an embodiment. The system 200 may be a representation of a laptop, a cellphone, a desktop, a server, a cloud computing system or any computing system capable to process huge amount of data known in the art. The system 200 includes an input unit 202, a spatial projection unit 204-1, a spatial hierarchical contextualization unit 206-1, a spatial gated aggregation unit 208-1 and a spatial modulator unit 210-1. The spatial projection unit 204-1, the spatial hierarchical contextualization unit 206-1, the spatial gated aggregation unit 208-1 and the spatial modulator unit 210-1 are all connected in series. The output from the input unit 202 is configured to provide an input to the spatial projection unit 204-1.

The system 200 further includes a temporal projection unit 204-2, a temporal hierarchical contextualization unit 206-2, a temporal gated aggregation unit 208-2 and a temporal modulator unit 210-2. The temporal projection unit 204-2, the temporal hierarchical contextualization unit 206-2, the temporal gated aggregation unit 208-2 and the temporal modulator unit 210-2 are also connected in series. The output from the input unit 202 is further configured to provide an input to the temporal projection unit 204-2. The system 200 further includes a memory 216 that stores set of instructions. All processing blocks such as 202, 204-1, 206-1, 208-1, 210-1, 204-2, 206-2, 208-2, 210-2, a query processing unit 212 and an output unit 214 are combinedly represented as a processor 218 of the system 200. The processor 218 is configured to execute the set of instructions stored in the memory 216 to cause the system 200 to perform the method of modeling local and global spatio-temporal context in a video for video recognition.

The input unit 202 is configured to receive a video. In an embodiment, the video could have format of AVI, MP4, MPEGAV, MOV or alike. The video could be compressed or uncompressed. The input unit 202 encodes the input video and produces a feature representation as below:

$$X_{st} \in R^{T \times H \times W \times C} \quad (1)$$

where $T$ = Number of frames, $H \times W$ = Spatial resolution, and $C$ = Number of channels The $X_{st}$ represents an input feature map generated at the output of the input unit 202 upon receiving the video. This spatio-temporal input is obtained by decoding the input video (which is currently in compressed bitstream format) into RGB frames using a video decoder tool. Using a uniform sampling method, T RGB frames are sampled from the video frames which are stacked together to form $X_{st}$.

Once, the input feature map $X_{st}$ is generated, it is provided as input to the spatial projection unit 204-1 as well as to the temporal projection unit 204-2, simultaneously. The spatial projection unit 204-1 and the temporal projection unit 204-2 includes a first linear function as $f_{z,s}$ and a second linear function $f_{z,t}$, respectively.

The spatial projection unit 204-1 then projects the input feature map $X_{st}$ into the first linear layer having the linear function $f_{z,s}$ and thus transforms the input feature map $X_{st}$ using the first linear function $f_{z,s}$ to generate a spatial feature map Zos. A linear function is a linear layer in neural networks which is parameterized by a learnable matrix $f_{z,s}$. In this case, it has the dimension of C×C which is multiplied with the input feature map $X_{st}$ to form a spatial feature map $Z_{0s}$. Similarly, at the same time, the temporal projection unit 204-2 projects the input feature map $X_{st}$ into a second linear layer having a second linear function $f_{z,t}$ (which is a linear layer parameterized by a learnable matrix $f_{z,s}$) and thus transforms the input feature map $X_{st}$ using the second linear functions $f_{z,t}$ to generate a temporal feature map $Z_{0t}$. Mathematically, both transformations are stored in the memory 216 and are given as below:

$$Z_{0s} = f_{z,s}(X_{st}) \in R^{T \times H \times W \times C} \quad (2)$$

$$Z_{0t} = f_{z,t}(X_{st}) \in R^{T \times H \times W \times C} \quad (3)$$

where $f_{z,s}$ and $f_{z,t}$ are the spatial and temporal linear projection layers or functions, respectively. In an embodiment, The spatial feature map ($Z_{0s}$) is representative of intra-frame features or spatial information in a frame of the video and the temporal feature map ($Z_{0t}$) is representative of inter-frame features or the temporal information across frames of the video.

Once the spatial feature map ($Z_{0s}$) as well as the temporal feature map ($Z_{0t}$) are generated at the output of the spatial projection unit 204-1 and the temporal projection unit 204-1, respectively, it is provided as input to the spatial hierarchical contextualization unit 206-1 as well as temporal hierarchical contextualization unit 206-2, respectively and simultaneously. The spatial hierarchical contextualization unit 206-1 is configured to apply a series of L depth-wise convolutions (DWConv) to the spatial projected inputs or the spatial feature map ($Z_{0s}$). The depth-wise convolutions (DWConv) are applied at multiple levels to the spatial feature map ($Z_{0s}$) to generate a level-specific spatial feature map Z's for each level. Similarly, the temporal hierarchical contextualization unit 206-2 is configured to apply a series of L pointwise-wise convolutions (PWConv) to the temporal projected inputs or the temporal feature map ($Z_{0t}$). The point-wise convolutions (PWConv) are also applied at multiple levels to the temporal feature map ($Z_{0t}$) to generate a level-specific temporal feature map $Z^{L}_{t}$, for each level. Mathematically, both operations as performed by the spatial hierarchical contextualization unit 206-1 and the temporal hierarchical contextualization unit 206-2, respectively, are defined in the memory 216 as below:

$$Z_s^l = f_{a,s}^l(Z_s^{l-1}) \triangleq GeLU(DWConv(Z_s^{l-1})) \in R^{T \times H \times W \times C} \quad (4)$$

$$Z_t^l = f_{a,t}^l(Z_t^{l-1}) \triangleq GeLU(PWConv(Z_t^{l-1})) \in R^{T \times H \times W \times C} \quad (5)$$

Accordingly, the spatial hierarchical contextualization unit 206-1 and the temporal hierarchical contextualization unit 206-2 generate the hierarchical contextual feature maps $Z^1{}_s$ for the spatial feature map and the hierarchical contextual feature maps $Z^1{}_t$ for the temporal feature map, respectively and simultaneously. The depth-wise convolution is implemented in the spatial hierarchical contextualization unit 206-1 using a GeLU activation function. Similarly, The point-wise convolution is implemented in the temporal hierarchical contextualization unit 206-1 using the GeLU activation function. In an embodiment, the GeLU activation function is stored in the memory 216 and is fetched by the processor 218 at the time of execution performed by the spatial hierarchical contextualization unit 206-1 and the temporal hierarchical contextualization unit 206-2, respectively.

In an embodiment, the spatial hierarchical contextualization unit 206-1 is further configured to perform a global-pooling operation on the level-specific spatial feature map corresponding to a highest level of the multiple levels to obtain a top-level spatial feature map $Z^{L+1}{}_S$. Mathematically, the spatial hierarchical contextualization unit 206-1 executes a mathematical function stored in the memory 216 as below:

$$Z_S^{L+1} = Avg - \text{Pool}(Z_S^L) \tag{6}$$

Similarly, the temporal hierarchical contextualization unit 206-1 is further configured to perform a global-pooling operation on the level-specific temporal feature map corresponding to a highest level of the multiple levels to obtain a top-level temporal feature map $Z^{L+1}{}_t$. Mathematically, the temporal hierarchical contextualization unit 206-2 also executes a mathematical function stored in the memory 216 as below:

$$Z_t^{L+1} = Avg\text{-}\text{Pool}(Z_t^L) \tag{7}$$

$Z^{L+1}{}_S$ is the top-level spatial feature map and $Z^{L+1}{}_t$, is the top-level temporal feature map are representative of a global context of the video.

Once, the hierarchical contextual feature maps $Z^1{}_s$ for the spatial feature map and the hierarchical contextual feature maps $Z^1{}_t$ for the temporal feature map is generated, both are provided as input to the spatial gated aggregation unit 208-1 and the temporal gated aggregation unit 208-2, respectively and simultaneously, to condense the respective spatial and temporal feature maps, $Z^1{}_s$ and $Z^1{}_t$, into the respective spatial and temporal modulators through a gating mechanism. As such, the spatial gated aggregation unit 208-1 is configured to apply a first set of gating weights $G_s$ to the hierarchical contextual feature maps $Z^1{}_s$ for the spatial feature map. Similarly, the temporal gated aggregation unit 208-2 is also configured to apply a second set of gating weights $G_t$ to the hierarchical contextual feature maps $Z^1{}_t$ for the temporal feature map. Mathematically, the first set of gating weights $G_s$ and the second set of gating weights $G_s$ are stored in the memory 216, as below:

$$G_s = f_{g,s}(X_{st}) \in R^{H \times W \times (L+1)}; \tag{8}$$

$$G_t = f_{g,t}(X_{st}) \in R^{T \times (L+1)}. \tag{9}$$

The spatial gated aggregation unit 208-1 is thus configured to aggregate the level-specific spatial feature map for the multiple levels using the first set of gating weights $G_s$ using a mathematical equation 10 as stored in the memory 216 and obtain output as $Z^{out}{}_s$. As such, the spatial gated aggregation unit 208-1 performs a dot product of the first set of gating weights $G^1{}_s$ and the level-specific spatial feature map $Z^1{}_s$ corresponding to each level to generate a first set of dot products. In an embodiment, the first set of dot products includes the dot product of a top-level spatial feature map $Z^{L+1}{}_S$ and the first set of gating weights $G^1{}_s$ corresponding to a level above the multiple levels. Once, the first set of dot products are generated, the spatial gated aggregation unit 208-1 aggregates the first set of dot products to obtain an aggregated spatial feature map $$Z_s^{out}.$$

To sum up, the spatial gated aggregation unit 208-1 executes a mathematical equation as stored in the memory 216 as below:

$$Z_s^{out} = \sum_{l=1}^{L+1} G_s^l \odot Z_s^l \in R^{H \times W \times C} \tag{10}$$

where, $$Z_s^{out}$$

is a single aggregated spatial feature map and $$G_s^l \in R^{H \times W \times 1}$$

are slices of $G_s$ for $1^{th}$ level. In an embodiment, the first set of dot products includes a dot product of an additional level-specific spatial feature map $$Z_s^1$$

and the first set of gating weights $$G_s^1$$

corresponding to a level above the multiple levels.

Similarly, the temporal gated aggregation unit 208-2 is also configured to aggregate the level-specific temporal feature map for the multiple levels using the second set of gating weights $$G_t^1$$

using another mathematical equation stored in the memory 216 and obtain output as $$Z_t^{out}.$$

As such, the temporal gated aggregation unit 208-2 also performs a dot product of the second set of gating weights $$G_t^1$$

and the level-specific spatial feature map $$Z_t^1$$

corresponding to each level to generate a second set of dot products. In an embodiment, the second set of dot products includes a dot product of the top-level temporal feature ma $$Z_t^{L+1}$$

and the second set of gating weights $$G_t^1$$

corresponding to a level above the multiple levels.

Once, the second set of dot products are generated, the temporal gated aggregation unit 208-2 aggregates the second set of dot products to obtain an aggregated spatial feature map $$Z_t^{out}.$$

To sum up, the temporal gated aggregation unit 208-2 also executes a mathematical equation as stored in the memory 216 as below:

$$Z_t^{out} = \sum_{l=1}^{L+1} G_t^l \odot Z_t^l \in R^{T \times C} \tag{11}$$

where, $$Z_t^{out}$$

is a single aggregated temporal feature map and $$G_t^l \in R^{T \times 1}$$

are slices of $G_t$ for $1^{st}$ level. Also, in both cases, the generation and aggregation of the hierarchical contextual feature maps for the spatial feature map $Z_{0s}$ is performed independent of generation and aggregation of the hierarchical contextual feature maps for the temporal feature map $Z_{0t}$. Both processes are performed simultaneously in the spatial gated aggregation unit 208-1 and the temporal gated aggregation unit 208-2.

Once the aggregated spatial feature map for multiple level $$Z_s^{out}$$

is generated, it is provided as input to the spatial modulator unit 210-1. The spatial modulator unit 210-1 is configured to apply a first set of linear layer $h_s(\cdot)$ stored in the memory 216 to the aggregated spatial feature map $$Z_s^{out}$$

to obtain a spatial modulator $M_s$. Mathematically, the spatial modulator unit 210-1 is configured to apply a mathematical equation as stored in the memory 216 as below:

$$M_s = h_s(Z_s^{out}) \in R^{T \times H \times W \times C} \tag{12}$$

Thus, the output of the spatial modulator unit 210-1 generates a spatial modulator $M_s$.

Similarly, once the aggregated temporal feature map for multiple level $$Z_t^{out}$$

is generated, it is also provided as input to the temporal modulator unit 210-2. The temporal modulator unit 210-2 is also configured to apply a linear function $h_t(\cdot)$ stored in the memory 216 to the aggregated temporal feature map $$Z_t^{out}$$

to obtain a temporal modulator $M_t$. Mathematically, the temporal modulator unit 210-2 is also configured to apply a mathematical equation as stored in the memory 216 as below:

$$M_t = h_t(Z_t^{out}) \in R^{T \times H \times W \times C} \tag{13}$$

Thus, the output of the temporal modulator unit 210-1 also generates a temporal modulator $M_t$.

Once, the spatial modulator $M_s$ and the temporal modulator $M_t$ are generated, both outputs along with a query token are added. The query token is generated by the query processing unit 212 within the processor 218. The query processing unit 212 is configured to generate a query token by applying a linear function such as a query projection function $q(\cdot)$ over the input feature map $X_{st}$. Addition of the three terms generates an output spatio-temporal feature map $y_i$. Mathematically, the processor 218 performs an element-wise multiplication between the query token, the spatial modulator $M_s$ and the temporal modulator $M_t$ and obtains the output spatio-temporal feature map y; based on the spatial modulator $M_s$, the temporal modulator $M_t$, and the generated query token associated with the video. The same is defined in the memory 216 as below:

$$y_i = q(x_i) \odot h_s\left(\sum_{l=1}^{L+1} g_{i,s}^l \cdot z_{i,s}^l\right) \odot h_t\left(\sum_{l=1}^{L+1} g_{i,t}^l \cdot z_{i,t}^l\right) \quad (14)$$

where $$z_{i,s}^l / z_{i,t}^l$$

and $$g_{i,s}^l / g_{i,t}^l$$

are the spatial and temporal visual feature, respectively, and spatial and temporal gating value at location i of $Z^\ell_s/Z^\ell_t$ and $G^\ell_s/G^\ell_t$, respectively.

Once the processor 218 generates the output spatio-temporal feature map $y_i$, the processor 218 further executes a video recognition model over the output spatio-temporal feature map $y_i$ in the output unit 214 to classify the video into a specified classification. Herein $y_i$ denotes the processed vector at a single location point having size of 1×C corresponding to the spatio-temporal tensor $X_{st}$ whose size is T×H×W×C. The video recognition model is stored in the memory 216. Once the output spatio-temporal feature map y; is generated, it is passed through a classifier head in the form of a linear layer (parameterized by a learnable matrix of dimension C×N, where N denotes the number of classes). Specifically, the feature map y (with dimensions T×H×W×C) is averaged pool in the spatio-temporal axis to produce a single vector having dimensions 1×C. The classifier head projects the vector into probabilities among the N classes (1×C→1×N). Finally, the action class having maximum probability is assigned as the predicted action class. In an embodiment, the system 200 may include a display unit 220, such as a monitor. The output unit 214 may be connected to the display unit 220 to display the output spatio-temporal feature map $y_i$ generated from the output unit 214. The entire processing module of the processor 218 is termed as a focal modulation process or a Video-FocalNet. In an embodiment, the system 200 may include other processing components as desired to achieve the method of for modeling local and global spatio-temporal context in a video for video recognition. For example, ROM, RAM, GPU, external hardware or software etc.

In another embodiment, the processor 218 is configured to perform a method for modeling local and global spatio-temporal context in a video for video recognition. The method includes obtaining a spatial feature map $Z_{0s}$ and a temporal feature map $Z_{0t}$ for a video. The method further includes generating hierarchical contextual feature maps $Z^l_s$ s and $Z^l_t$ based on the spatial feature map $Z_{0s}$ and the temporal feature map $Z_{0t}$ that represent a context of the video at multiple levels of granularity. The method further includes aggregating the hierarchical contextual feature maps $Z^l_s$ and $Z^l_t$ based on gating weights $G_s$ and $G_t$ to obtain a spatial modulator $M_s$ and a temporal modulator $M_t$ that are representative of an aggregated context across the multiple levels. The method further includes obtaining an output spatio-temporal feature map y; based on the spatial modulator $M_s$, the temporal modulator $M_t$ and a query token $q(x_i)$ associated with the video.

Figure 3:
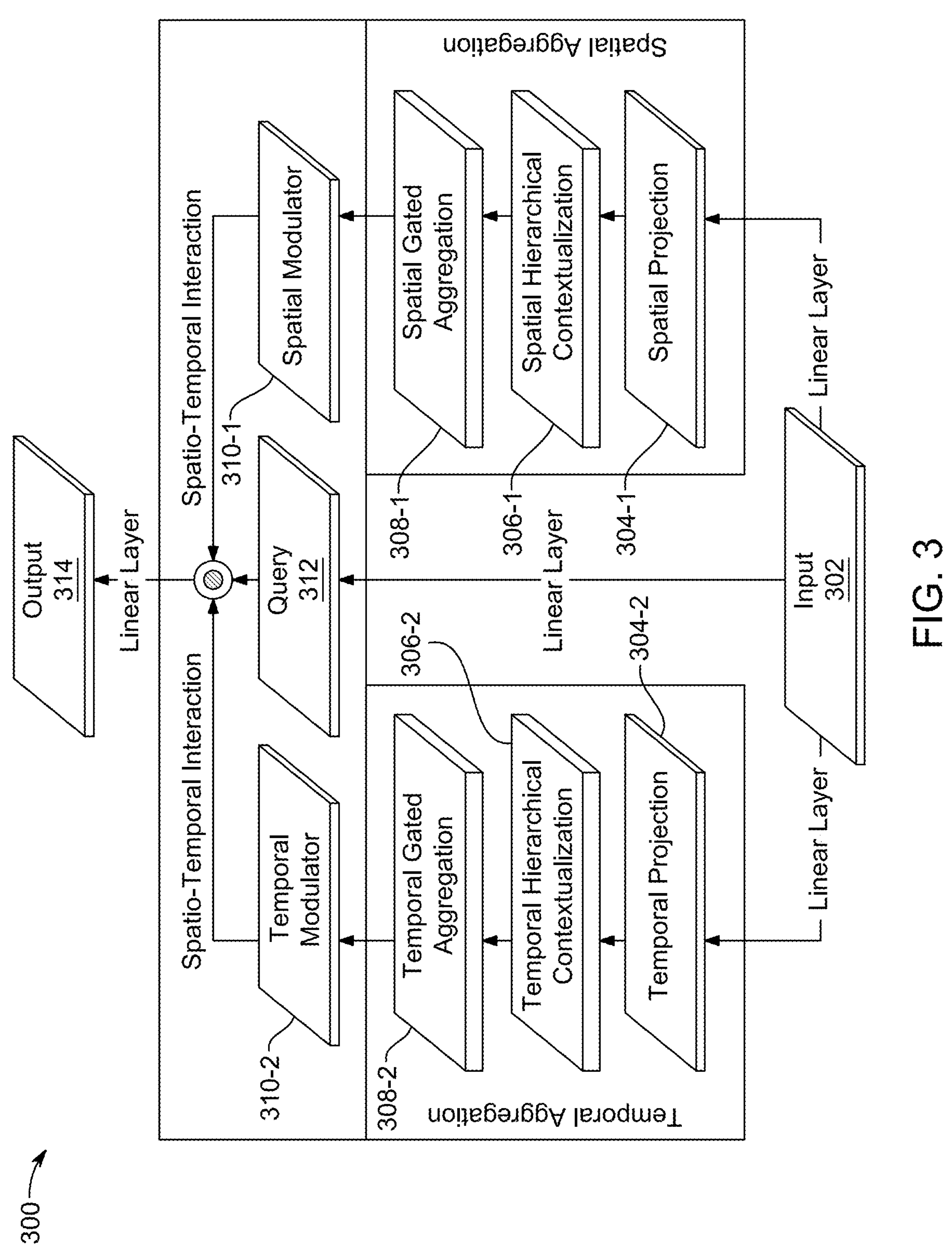
FIG. 3 illustrates a generalized flow diagram for modeling local and global spatio-temporal context in the video for video recognition, according to certain embodiments.

FIG. 3 illustrates a generalized flow diagram 300 for modeling local and global spatio-temporal context in the video for video recognition, according to an embodiment. The flow diagram is executed in the processor 218 of the system 200 as described in FIG. 2. The flow diagram includes plurality of steps such as obtaining a spatial feature map and a temporal feature map for a video using an input section 302. The flow diagram includes plurality of steps such as obtaining a spatial feature map and a temporal feature map for a video using an input section 302 in spatial projection section 304-1 and temporal projection section 304-2, respectively. For example, the spatial projection section 304-1 transforms the input feature map $X_{st}$ using the first linear function $f_{z,s}$ to generate the spatial feature map $Z_{0s}$, and temporal projection section 304-2 transforms the input feature map $X_{st}$ using the second linear function $f_{z,t}$ to generate the temporal feature map $Z_{0t}$. The flow diagram further includes generating hierarchical contextual feature maps based on the spatial feature map and the temporal feature map that represent a context of the video at multiple levels of granularity. The hierarchical contextual feature maps based on the spatial feature map is generated in spatial projection section 306-1. The hierarchical contextual feature maps based on the temporal feature map is generated in temporal projection section 306-2. The flow diagram further includes aggregating the hierarchical contextual feature maps based on gating weights $G_s$ to obtain an aggregated spatial feature map $Z^{out}_s$ in the spatial gated aggregation section 308-1, and the spatial modular $M_s$ that is representative of an aggregated context across the multiple levels is obtained in the spatial modulator section 310-1 based on the aggregated spatial feature map and a linear layer $h_s(\cdot)$. Similarly, aggregating the hierarchical contextual feature maps based on gating weights $G_t$ is performed in a temporal gated aggregation section 308-2, and the temporal modulator $M_t$ that is representative of an aggregated context across the multiple levels is obtained in the temporal modulator section 310-2 based on the aggregates temporal feature map and a linear layer $h_t(\cdot)$. The flow diagram further includes obtaining an output spatio-temporal feature map based on the spatial modulator, the temporal modulator and a query token (e.g., obtained using a query generation section 312) associated with the video. The query token is a single vector (with dimension 1×C) in the original spatio-temporal feature map $X_{st}$ (whose dimensions are T×H×W×C). The query vector is processed using the proposed spatio-temporal blocks to produce the corresponding aggregated query token $y_i$. The output spatio-temporal feature map is obtained by an output section 314 using the output of the spatial modulator section 310-1, temporal modulator section 310-2 and a query generation section 312.

In an embodiment, the input section 302 is representative of the input unit 202 of the processor, the spatial projection section 304-1 is representative of the spatial projection unit 204-1 in the processor, the spatial hierarchical contextualization section 302-1 is representative of the spatial hierarchical contextualization unit 206-1 of the processor 218, the spatial gated aggregation section 308-1 is representative of the spatial gated aggregation unit 208-1, the spatial modulator section 310-1 is representative of the spatial modulator unit 210-1 of the processor 218. The query generation section 312 is representative of the query processing unit 212 of the processor 218, and the output session 314 is representative of the output unit 214 of the processor 218. In an embodiment, the temporal projection section 304-2 is representative of the temporal projection unit 204-2 of the processor 218, the temporal hierarchical contextualization section 302-2 is representative of the temporal hierarchical contextualization unit 206-2 of the processor 218, the temporal gated aggregation section 308-2 is representative of the temporal gated aggregation unit 208-2, and the temporal modulator section 310-2 is representative of the temporal modulator unit 210-2 of the processor 218 in FIG. 2.

Figure 4A:
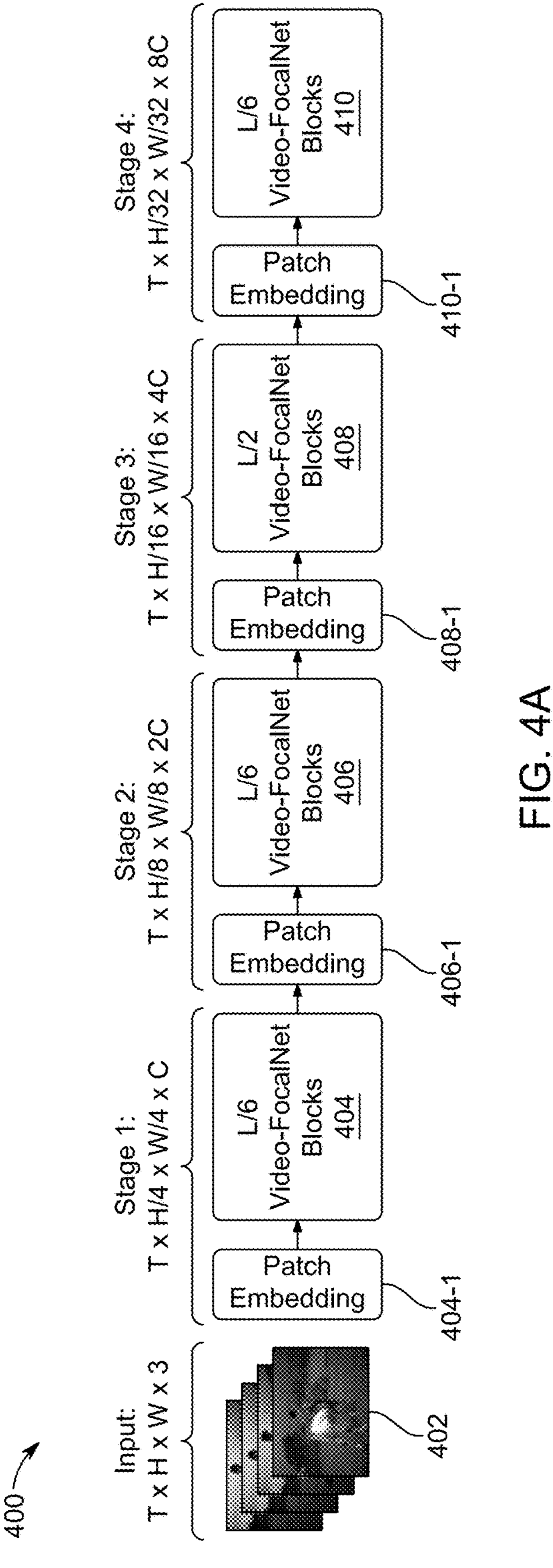
FIG. 4A illustrates a four-stage architecture of spatio-temporal based focal modulation unit, according to certain embodiments.

FIG. 4A illustrates a four-stage architecture of spatio-temporal based focal modulation unit 400, according to an embodiment. Each stage represent a video-focalNet block such as 404, 406, 408 and 410. Each Video-focalNet block 404, 406, 408 and 410 represents blocks configured to execute the flow diagram 300 in FIG. 3 using the processor 218 in FIG. 2. The spatio-temporal based focal modulation unit 400 is configured to receive an input video 402. In each stage, a stack of L Video-FocalNet blocks is used, divided between the four stages as {L/6, L/6, L/2, L/6}. In an embodiment, the architecture hyper-parameters of these model variants are as below:

$$Video\text{-}FocalNet\text{-}T\text{: } C = 96,\ block_{num} = \{2, 2, 6, 2\};$$

$$Video\text{-}FocalNet\text{-}S\text{: } C = 96,\ block_{num} = \{2, 2, 18, 2\};$$

$$Video\text{-}FocalNet\text{-}B\text{: } C = 128,\ block_{num} = \{2, 2, 18, 2\};$$

The spatio-temporal based focal modulation unit 400 uses a non-overlapping convolution layers for patch embedding 404-1, 406-1, 408-1 and 410-1 at the beginning (kernel size=4×4, stride=4) and between two stages (kernel size=2×2, stride=2), respectively. The focal levels (L) for the models are set to two with the kernel for the first level set to $k^1=3$.

Figure 4B:
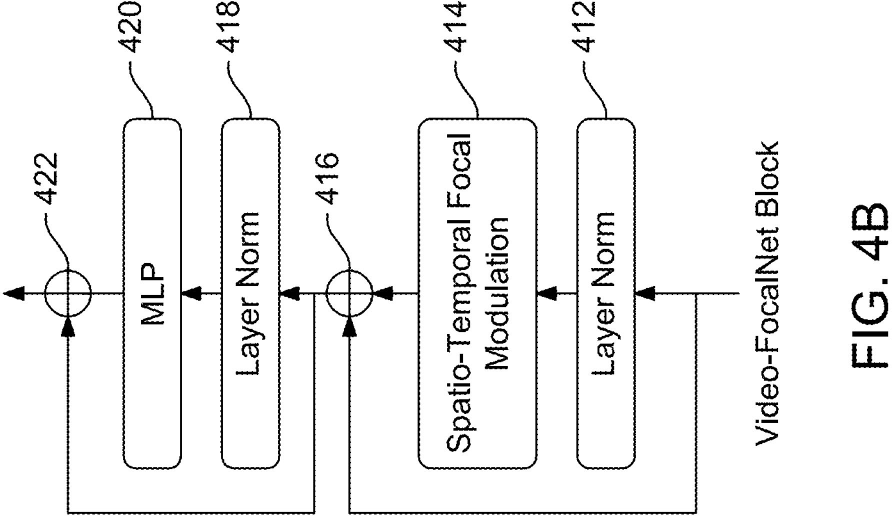
FIG. 4B illustrates an internal architecture of a single Video-focalNet block, according to certain embodiments.

FIG. 4B illustrates an internal architecture of a single Video-FocalNet block 400-1, according to an embodiment. Every single Video-focalNet block 400-1 is configured to include a layer norm 412, a spatio-temporal focal modulation block 414, a first adder block 416, a second layer norm 418, an MLP 420 and a second adder block 422. The Video-focalNet block 400-1 represents execution of the flow diagram 300 in FIG. 3 using the processor 218 illustrated in FIG. 2.

Figures 5A, 5B, 5C:
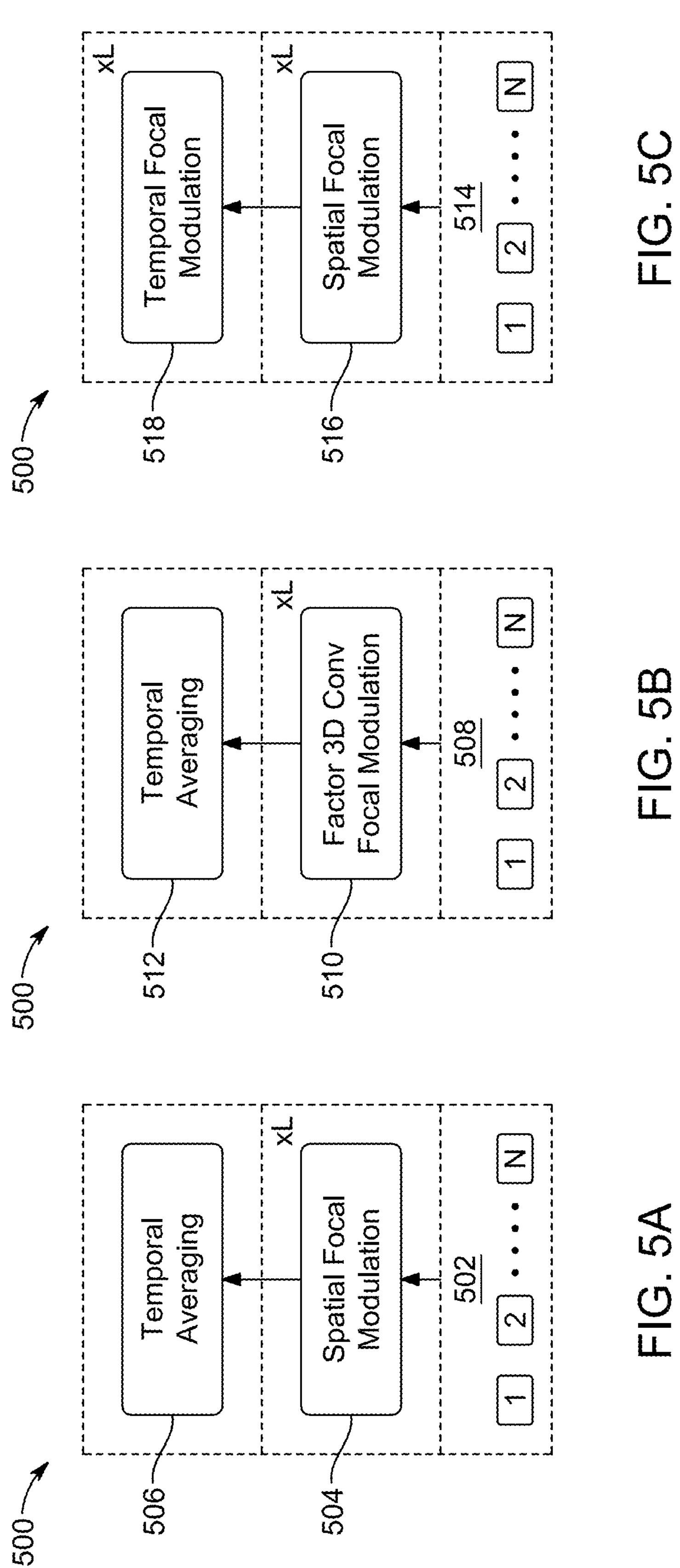
FIG. 5A-E illustrates a comparative analysis of the design structure of focal modulation used in the present invention against various other possible design structures, according to certain embodiments.

FIG. 5 illustrates a comparative analysis 500 of the design structure of the focal modulation used in the present invention against various other possible design structures, according to an embodiment. A first design in FIG. 5A is an extension of the spatial focal modulation to videos which passes each frame 502 through the spatial encoder 504 configured to use only 2D depth-wise convolution and temporal averaging block 506 configured to average along the temporal dimension. As such, the design in FIG. 5A illustrates a naive averaging solution where frames 502 are passing through spatial focal modulation layers and averaged. Mathematically, the output through this design can be written as:

$$y_i = T_{st}(M_s(i_t, X_{st,t})). \tag{15}$$

The second design in FIG. 5B is a variation of the neive averaging solution used in FIG. 5A, replacing 2D depth-wise convolution with factorized 3D convolution. The second design thus uses a factorized 3D convolution block 510. Here, each frame 508 passes through the factorized 3D convolution block 510 configured to perform 2D depth-wise convolution followed by 1D point-wise convolution and a temporal averaging block 512 configured to average along the temporal dimension.

The third design in FIG. 5C uses a factorized encoder block 516. The factorized encoder block 516 stacks two different encoders. One of the encoder is configured to perform spatial encoding process using 2D depth-wise convolution and the second encoder is configured to perform temporal encoding process using 1D depth-wise convolution. Here, each frame 514 passes through the factorized encoder 516 block configured to perform 2D depth-wise convolution followed by 1D depth-wise convolution and a temporal focal modulation block 518. The design in FIG. 5C replaces the spatial and temporal self-attention with a spatial and a temporal focal modulation block.

Figures 5D, 5E:
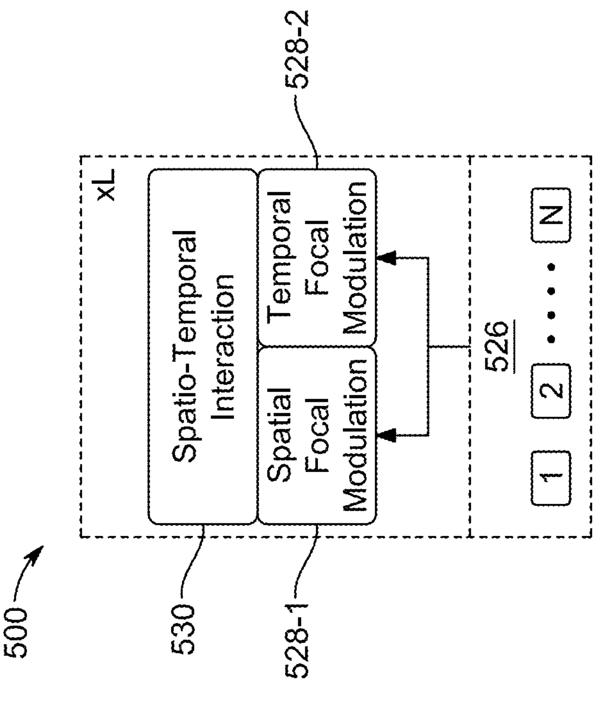

The fourth design in FIG. 5D follows a methodology of divided space-time attention. Here, each frame 520 passes through an alternating spatial focal modulation block 522 and a temporal focal modulation block 524.

The fifth design in FIG. 5E is the design used in the current invention that is, spatio-temporal focal modulation or Video-FocalNets. Here, each frame 526 passes through a spatial focal modulation block 528-1 and a temporal focal modulation block 528-2, simultaneously, followed by spatio-temporal interaction block 530.

Figure 6:
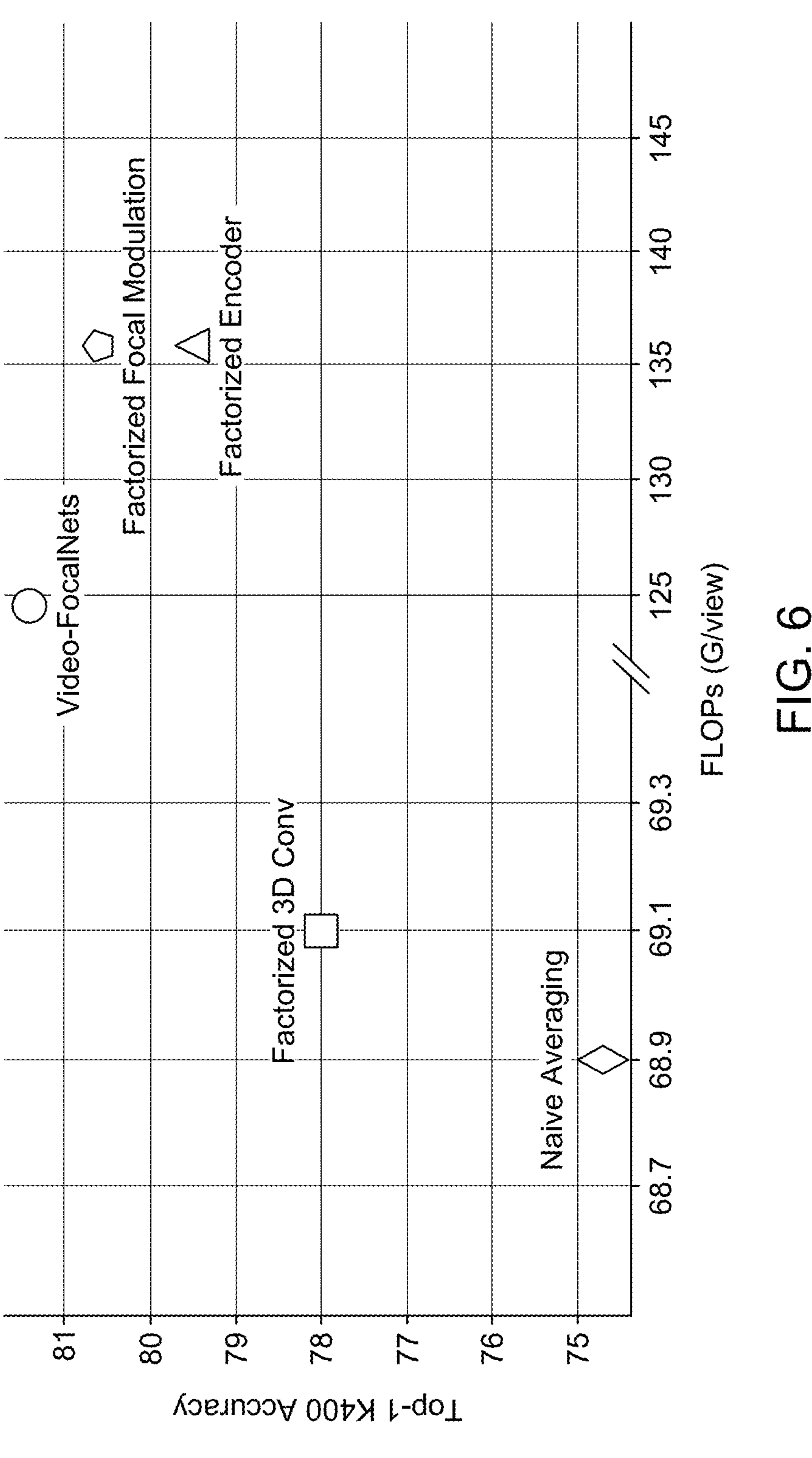
FIG. 6 illustrates a comparison chart for various design choices for spatio-temporal focal modulation on Kinetics-400 validation set, according to certain embodiments.

FIG. 6 illustrates a comparison chart 600 for various design choices for spatio-temporal focal modulation on Kinetics-400 validation set, according to an embodiment. The accuracy and computation requirements are shown in Y axis and X axis, respectively. The performance of various design structures discussed in FIG. 5 is graphically plotted. Based on the graphical observation, it was found that the proposed design structure of the spatio-temporal focal modulation used in the current invention performed better in terms of accuracy and computation as compared to other design structures.

Figure 7A:
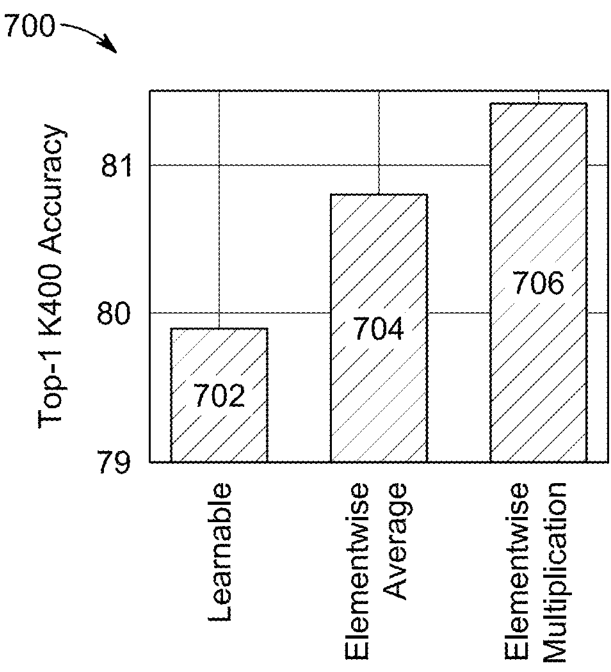
FIG. 7A illustrates ablation analysis chart of the model in terms of modular fusion method, according to certain embodiments.

FIG. 7A illustrates ablation analysis chart 700 of the model (that is, spatio-temporal focal modulation) in terms of modular fusion method, according to an embodiment. All ablations were performed using the variants of the current invention on K400 using the same dataset as used during analyzing the result. There were two modulators, since the model included a two-stream spatio-temporal focal modulation design. Each modulator was utilized for spatial and temporal branches, respectively. Further, both modulators were fused with query tokens. FIG. 7A accordingly shows comparison of three fusion techniques in terms of K400 accuracy on Y axis, such as a learnable projection layer fusion technique 702, simple averaging based fusion technique 704, and an element-wise multiplication based fusion technique 706, respectively on x-axis. From the three plots, it was observed that the element-wise multiplication based fusion technique 706 used in the current invention performed superior compared to other two methods used in the art.

Figure 7B:
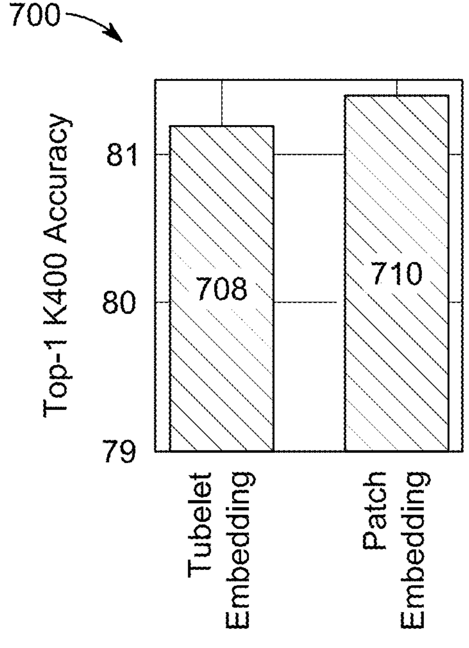
FIG. 7B illustrates a chart for ablation analysis of the model in terms of Patch embedding vs Tubelet embedding, according to certain embodiments.
Figure 8A:
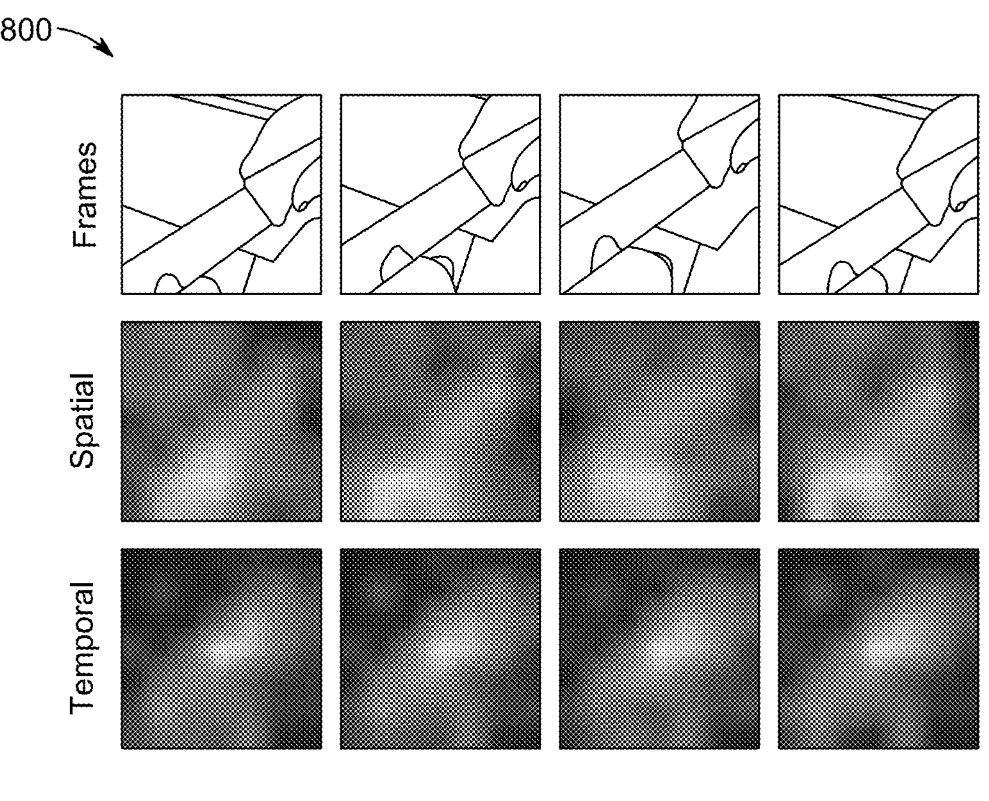
FIG. 8A-I illustrates visualization frames from spatial and temporal modulators, according to certain embodiments.
Figure 8B:
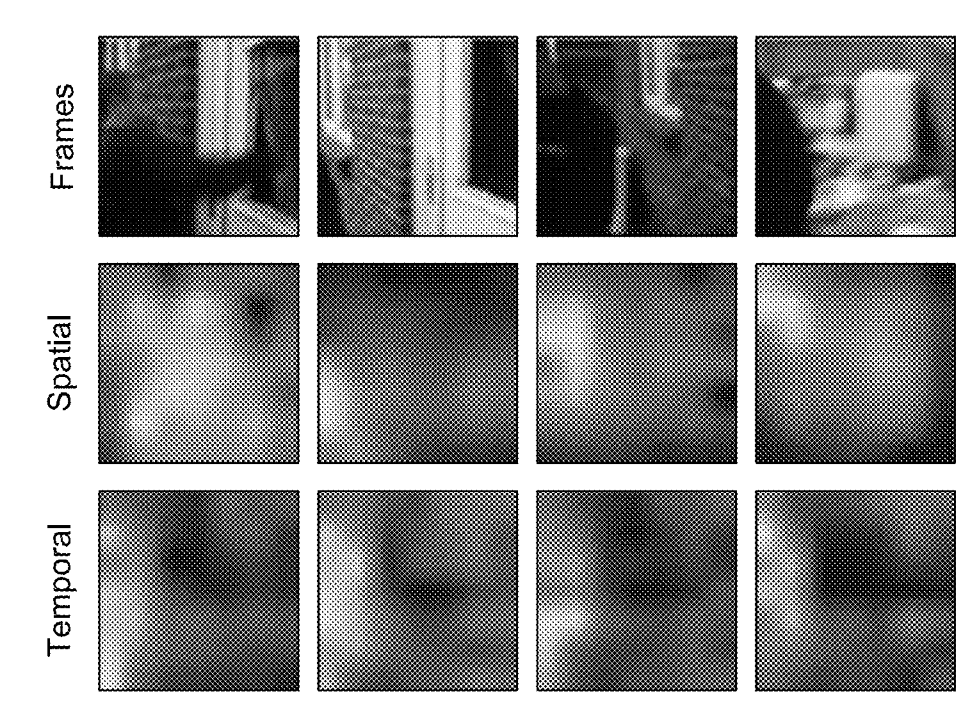
Figure 8C:
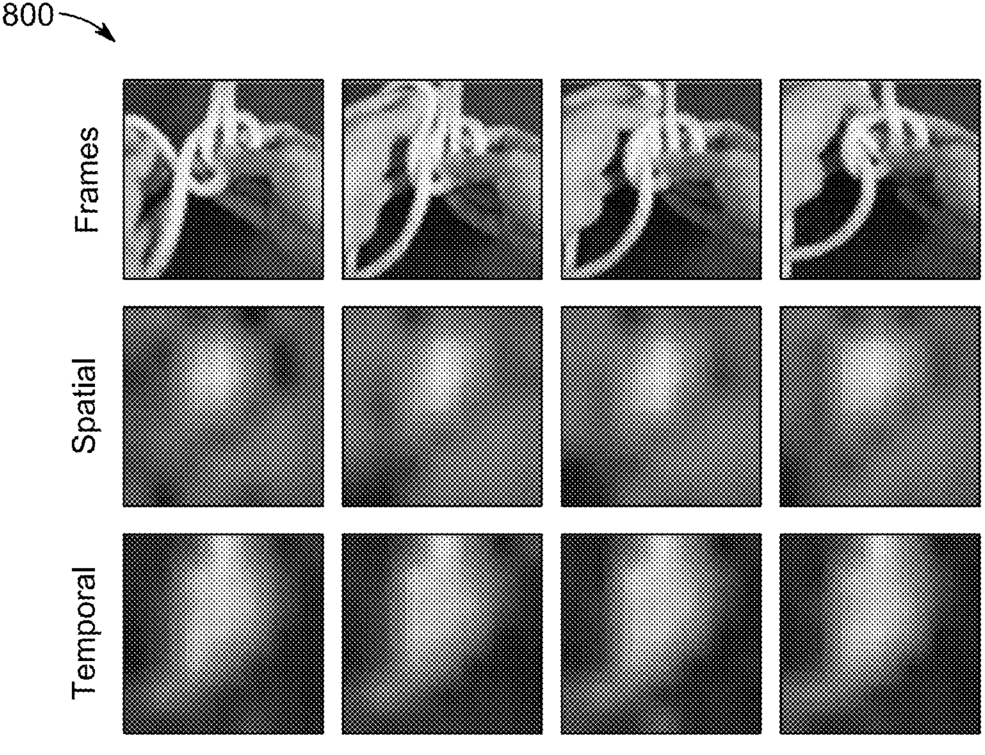
Figure 8D:
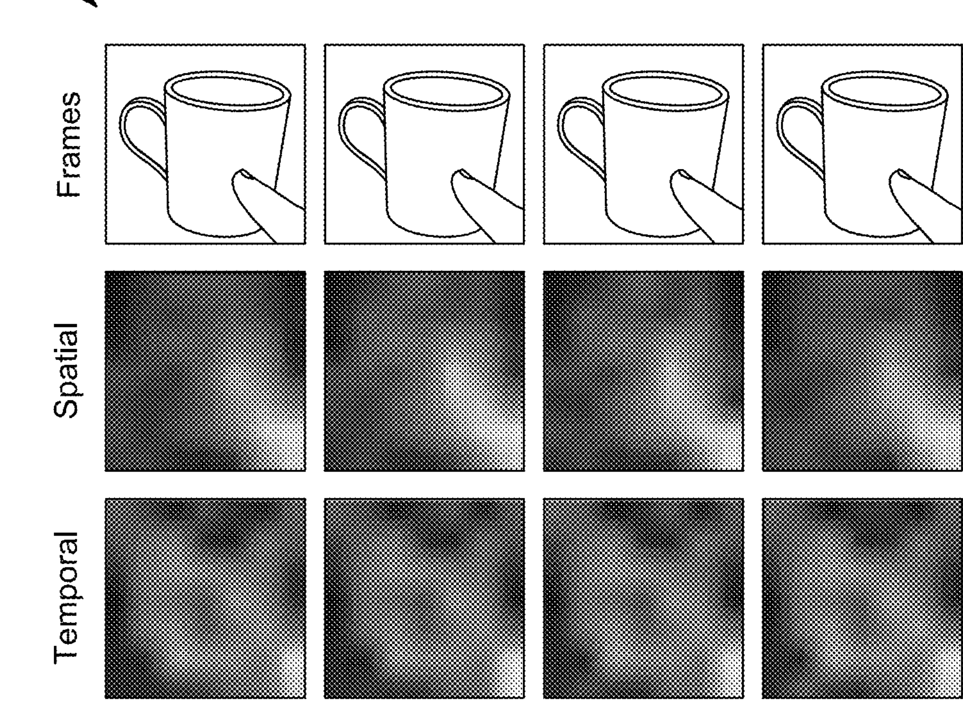
Figure 8E:
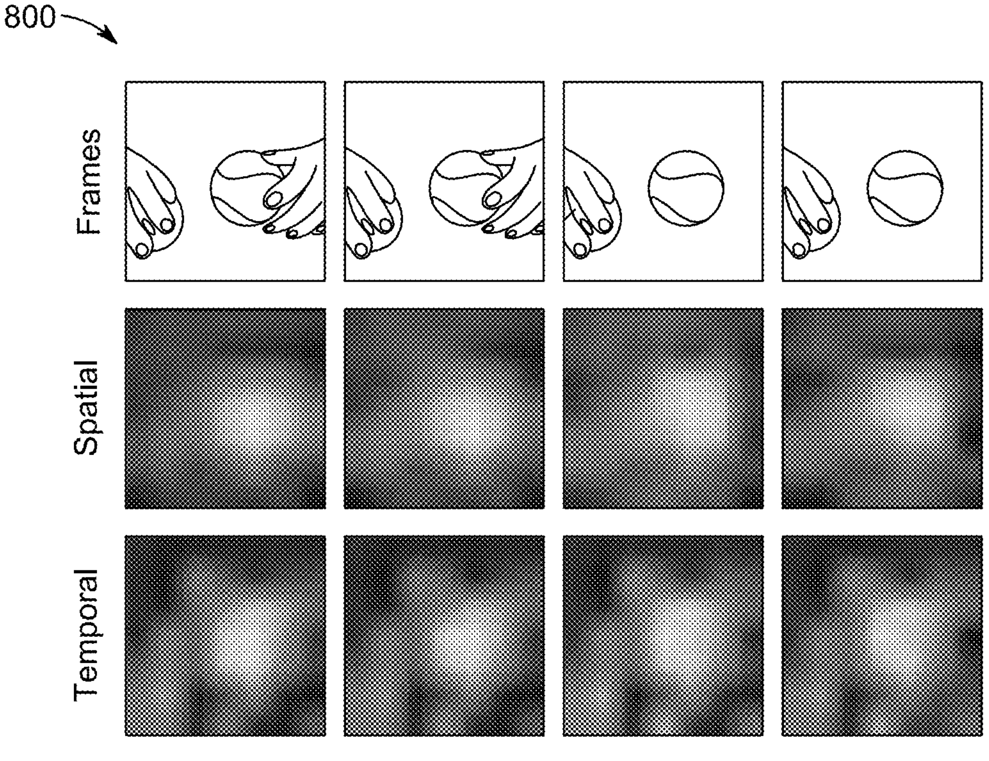
Figure 8F:
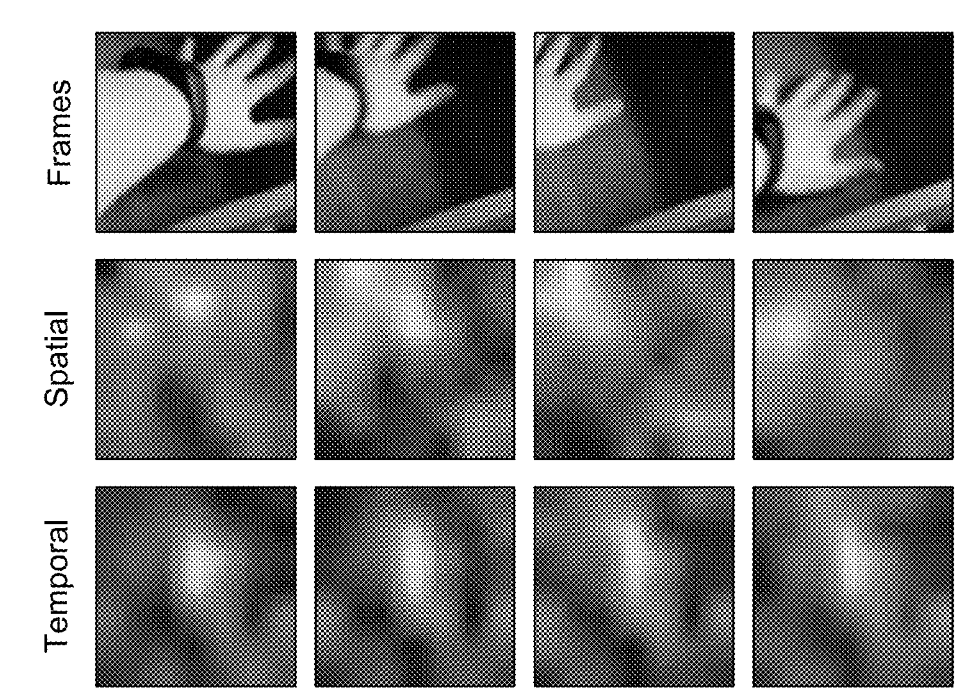
Figure 8G:
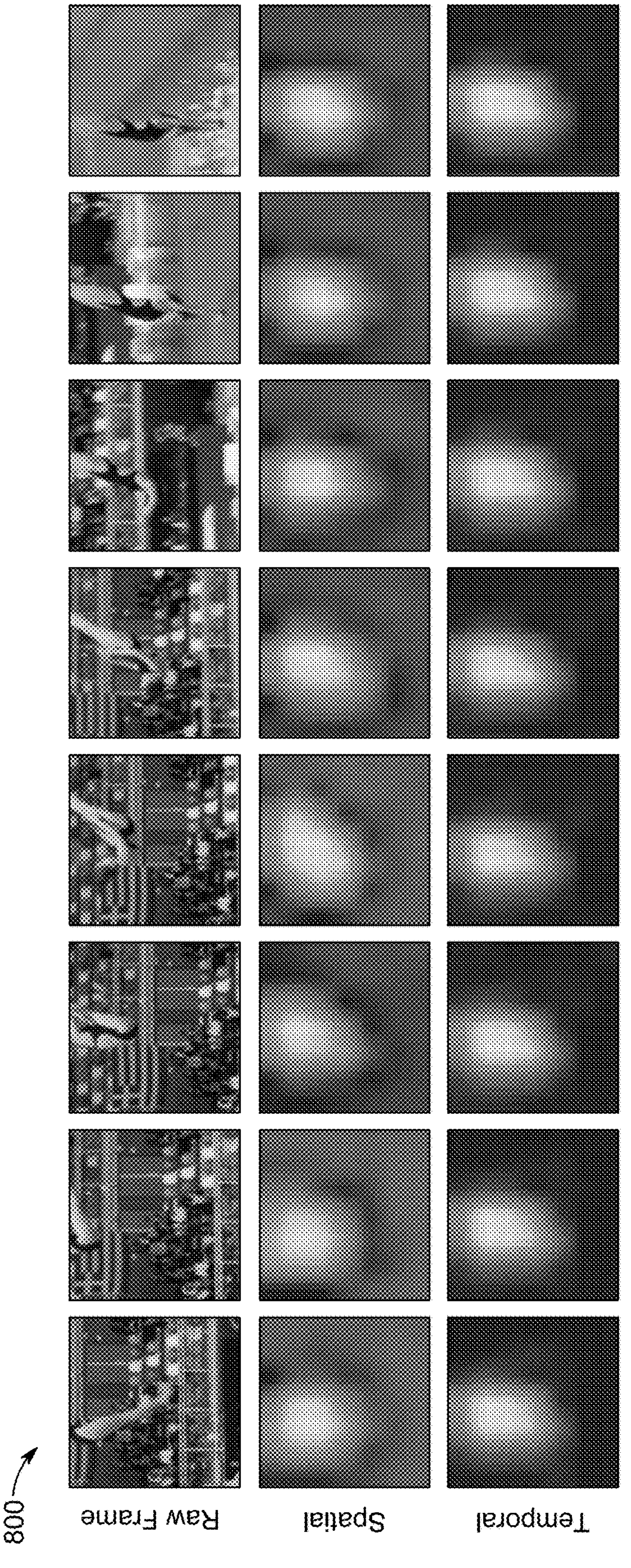
Figure 8H:
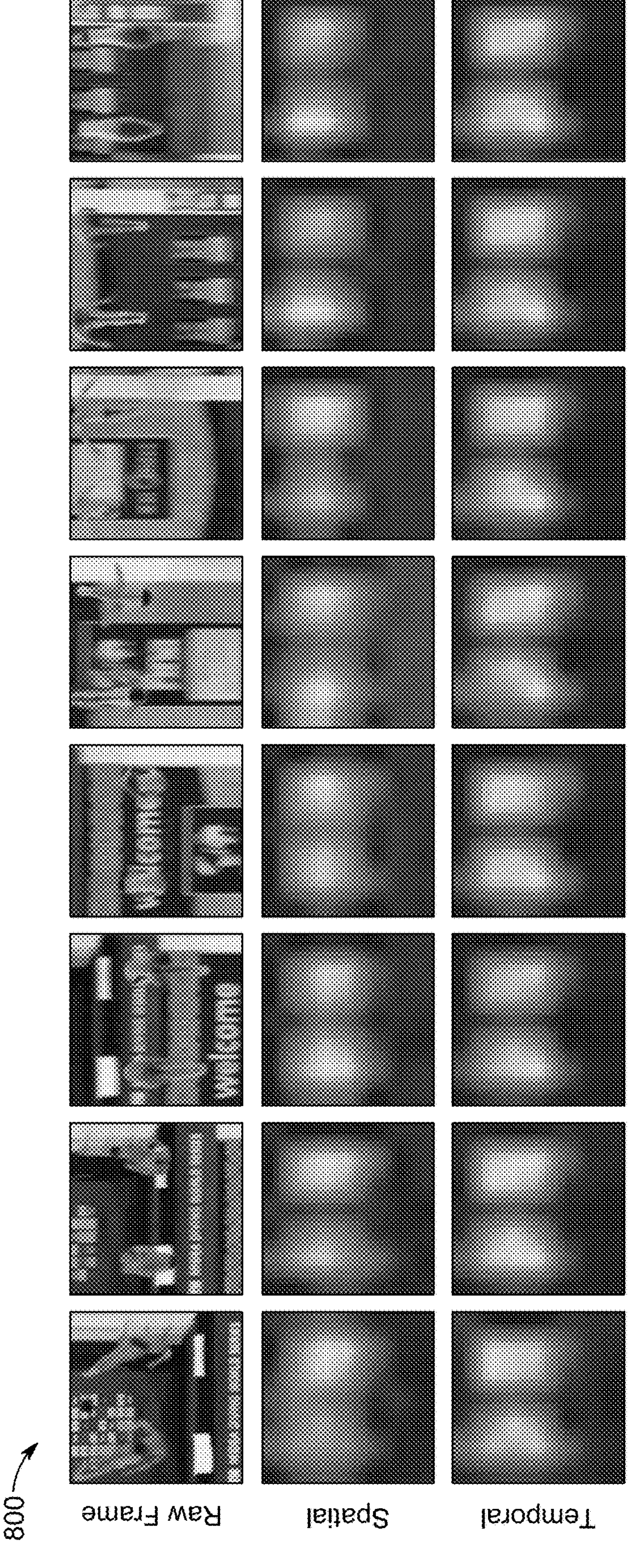
Figure 8I:
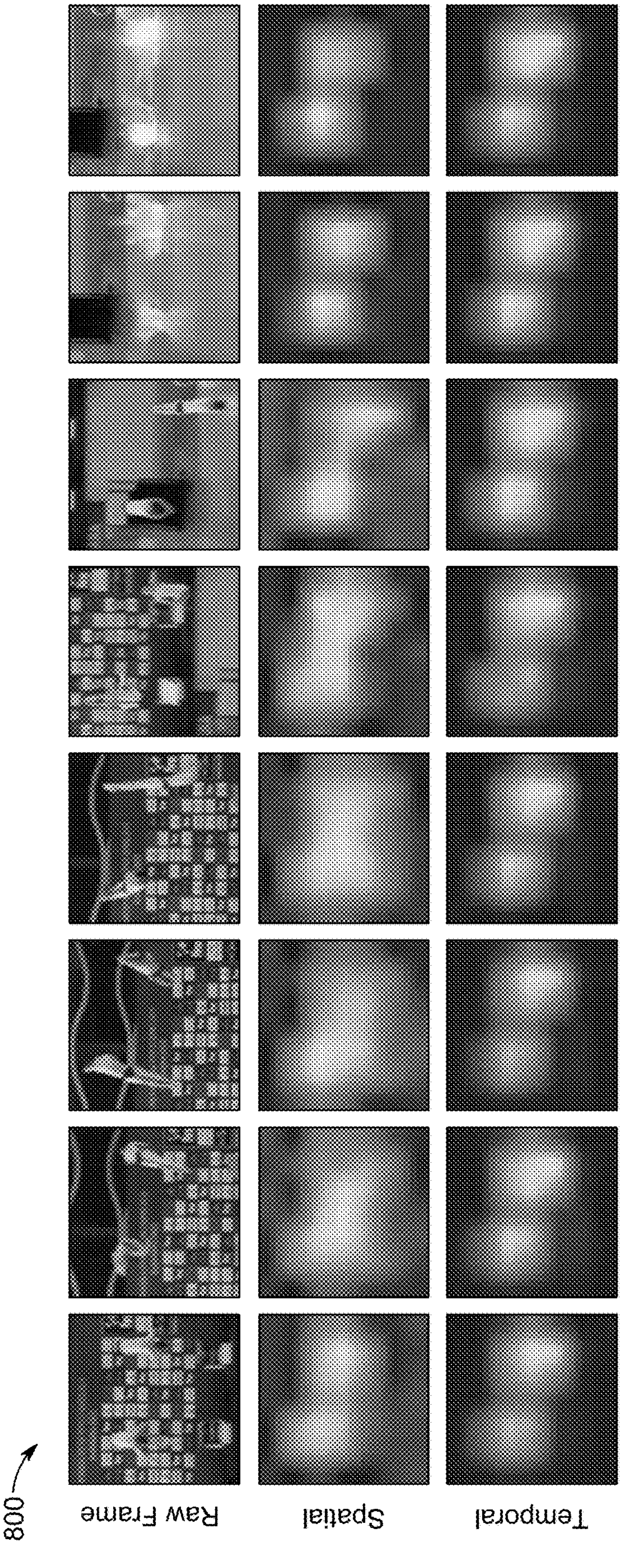

FIG. 7B illustrates a chart for ablation analysis of the model (that is, spatio-temporal focal modulation) in terms of Patch embedding vs Tubelet embedding, according to an embodiment. Prior art methods shows a plot 708 of tubelet embedding method that involved encoding a tubelet of T×H×W×3, with T=2, into a single token rather than patch embedding with T=1. A plot 710 shows a patch embedding method used in the current invention. The performance of both methods were analyzed in terms of K400 accuracy on Y axis. It was observed that a simple patch embedding method used in the current invention performs better than the tubelet embedding method used in the prior art.

FIG. 8 illustrates visualization frames 800 from spatial and temporal modulators, according to an embodiment. The visualization of the outputs from spatial and temporal modulators for sample videos across two datasets, K600 and SS-V2 were analyzed. FIGS. 8A, 8B and 8C illustrates spatial and temporal modulators for sample videos from Kinetics-600. The two modulators in the current invention focused on salient parts and essential dynamics of the video which were relevant to the end task. The spatial modulator tends to shift to the local spatial changes in individual frames, while the temporal modulator fixates to the global region across frames where the majority of the motion happens. For example in FIG. 8A, the temporal modulator specifically focuses on the point where the knife meets the apple, while the spatial modulator shifts focus from frame to frame based on the knife's position. Similarly, in FIG. 8B, the temporal modulator specifically focuses on the point where smashing happens, while the spatial modulator shifts focus from frame to frame based on position of the person. FIG. 8C illustrates another example of tying knots for both temporal and spatial modulators. Considering the three images, it was observed that the temporal modulator fixate on the global motion across frames while the spatial modulator captures local variations. FIG. 8D, FIG. 8E and FIG. 8F illustrates spatial and temporal modulators for sample videos from Something-Something-V2. Further, FIG. 8G, FIG. 8H and FIG. 8I illustrate outputs from spatial and temporal modulators on diving 48 datasets. The example was presented with one diver in FIG. 8G and two divers in FIGS. 8H and 8I. It was observed in FIG. 8G that the model used in the present invention was able to focus on the specific region of action, regardless of the camera movement. In FIGS. 8H and 8I, the background was quite similar to the foreground action. It was observed that the temporal modulator was again able to separately track the two divers in multiple frames, while the spatial modulator struggles to do so. Moreover, the model used in the present invention was able to separate out the two regions of actions for both divers.

Results for video action recognition on three datasets, Kinetics-400 (K400), Kinetics-600 (K600) and Something-Something-v2 (SS-v2) was analyzed. For each dataset, training set was used to train the model and evaluated on the validation set. K400 included ~240 k training and ~20 k testing videos across 400 classes. K600 included ~370 k training and 28.3 k testing videos across 600 classes. Further, SS-v2 included 169 k training and 24.7 k validation videos across 174 classes.

For K400 and K600, a training scheme was used to train the model for 120 epochs with a linear warmup of 20 epochs using an SGD optimizer. Further, the learning rate was linearly scaled by:

$$LR \times batchsize/512$$

where LR=1.6-3 is a base learning rate.
The spatial modules were initialized from the pretrained Imagenet-1K FocalNet weights as reported in the art, while other were randomly initialized. To each clip, a horizontal flip was applied, Mixup (α=0.8) and CutMix, each with a probability of 0.5.

During training, T frames with a stride of t were sampled, denoted as $T\times\tau$. For the spatial domain, a crop of $H\times W=224\times 224$ was used, with in-put area selected within a scale of [min, max]=[0.08, 1.00] and aspect ratio jitter between 3/4 and 4/3.

During inference, results were reported as an average across $N_{clip}\times N_{crops}$ where a total of $N_{clip}$ were uniformly sampled from the video, and for each video, $N_{crops}$ spatial crops were taken during inference. For K400 and K600 4×3 was used for inference. For SS-v2, the same training recipe was used as in K400 and K600, with slight changes. The model was initialized with the K400 pretrained weights. For augmentations, use 1×3 views were used during inference. Comparison with conventional information:

(1) Kinetics-400: On the K400 dataset, results for the Video-FocalNet-T, Video-FocalNet-S, and Video-FocalNet-B variants were reported, comparing against recent methods in Table 1. Considering first the T and S variants, it was concluded that the current invention surpassed the equivalent Video-Swin Transformer variants by 1.0% and 0.8% respectively, while reducing the TFLOPs by 25%. Larger base model, Video-FocalNet-B, surpassed the previous state-of-the-art Uniformer-B and MViTv2-B by 0.6% and 0.7% respectively, while maintaining comparable TFLOPs with MViTv2-B and reducing TFLOPs by about 45% compared to 10 Uniformer-B.

TABLE 1

Comparison with conventional information on Kinetics-400

| Method | Pre-training | Top-1 | Views | FLOPs (G/view) |
|---|---|---|---|---|
| TEA (ICCV'21) [1] | ImageNet-21K | 76.1 | 10 × 3 | 70 |
| TSM-ResNeXt-101 (ICCV'21) [2] | ImageNet-21K | 76.3 | — | — |
| I3D NL (ICCV'21) [3] | ImageNet-21K | 77.7 | 10 × 3 | 359 |
| VidTR-L (ICCV'21) [4] | ImageNet-21K | 79.1 | 10 × 3 | 351 |
| LGD-3D R101 (CVPR'19) [5] | ImageNet-21K | 79.4 | — | — |
| SlowFast R101-NL (ICCV'19) [6] | ImageNet-21K | 79.8 | 10 × 3 | 234 |
| X3D-XXL (CVPR'20) [7] | ImageNet-21K | 80.4 | 10 × 3 | 194 |
| OmniSource (ECCV'20) [8] | ImageNet-21K | 80.5 | — | — |
| TimeSformer-L (ICML'21) [9] | ImageNet-21K | 80.7 | 1 × 3 | 2380 |
| MFormer-HR (NeurIPS'21) [10] | ImageNet-21K | 81.1 | 10 × 3 | 959 |
| MViTv1-B (ICCV'21) [11] | — | 81.2 | 3 × 3 | 455 |
| MoViNet-A6 (CVPR'21) [12] | ImageNet-21K | 81.5 | 1 × 1 | 390 |
| ViViT-L FE (CVPR'21) [13] | ImageNet-21K | 81.7 | 1 × 3 | 3980 |
| MTV-B (CVPR'22) [14] | ImageNet-21K | 81.8 | 4 × 3 | 399 |
| MTV-B (320p) (CVPR'22) [14] | ImageNet-21K | 82.4 | 4 × 3 | 967 |
| Video-Swin-T (CVPR'22) [15] | ImageNet-1K | 78.8 | 4 × 3 | 88 |
| Video-Swin-S (CVPR'22) [15] | ImageNet-1K | 80.6 | 4 × 3 | 166 |
| Video-Swin-B (CVPR'22) [15] | ImageNet-1K | 80.6 | 4 × 3 | 282 |

TABLE 1-continued

Comparison with conventional information on Kinetics-400

| Method | Pre-training | Top-1 | Views | FLOPs (G/view) |
|---|---|---|---|---|
| Video-Swin-B (CVPR'22) [15] | ImageNet-21K | 82.7 | 4 × 3 | 282 |
| MViTv2-B (CVPR'22) [16] | — | 82.9 | 5 × 1 | 226 |
| Uniformer-B (ICLR'22) [17] | ImageNet-1K | 83.0 | 4 × 3 | 259 |
| Video-FocalNet-T | ImageNet-1K | 79.8 | 4 × 3 | 63 |
| Video-FocalNet-S | ImageNet-1K | 81.4 | 4 × 3 | 124 |
| Video-FocalNet-B | ImageNet-1K | 83.6 | 4 × 3 | 149 |

[1] Yan Li, Bin Ji, Xintian Shi, Jianguo Zhang, Bin Kang, and Limin Wang. Tea: Temporal excitation and aggregation for action recognition. In CVPR, 2020.2,6, incorporated herein by reference in its entirety.

[2] Ji Lin, Chuang Gan, and Song Han. Tsm: Temporal shift module for efficient video understanding. In ICCV, 2019. 2, 6, incorporated herein by reference in its entirety.

[3] Xiaolong Wang, Ross Girshick, Abhinav Gupta, and Kaiming He. Non-local neural networks. In CVPR, 2018. 2, 6, incorporated herein by reference in its entirety.

[4] Yanyi Zhang, Xinyu Li, Chunhui Liu, Bing Shuai, Yi Zhu, Biagio Brattoli, Hao Chen, Ivan Marsic, and Joseph Tighe. Vidtr: Video transformer without convolutions. In ICCV, 2021. 2, 3, 6, 7, incorporated herein by reference in its entirety.

[5] Zhaofan Qiu, Ting Yao, Chong-Wah Ngo, Xinmei Tian, and Tao Mei. Learning spatio-temporal representation with local and global diffusion. In CVPR, 2019. 2, 6, incorporated herein by reference in its entirety.

[6] Christoph Feichtenhofer, Haoqi Fan, Jitendra Malik, and Kaiming He. Slowfast networks for video recognition. In ICCV, 2019. 2, 6, 7, incorporated herein by reference in its entirety.

[7] Christoph Feichtenhofer. X3d: Expanding architectures for efficient video recognition. In CVPR, 2020. 2, 6, 7, incorporated herein by reference in its entirety.

[8] Haodong Duan, Yue Zhao, Yuanjun Xiong, Wentao Liu, and Dahua Lin. Omni-sourced webly-supervised learning for video recognition. In ECCV, 2020.2, 6, incorporated herein by reference in its entirety.

[9] Gedas Bertasius, Heng Wang, and Lorenzo Torresani. Is space-time attention all you need for video understanding? In ICML, 2021. 1, 2, 3, 5, 6, 7, incorporated herein by reference in its entirety.

[10] Mandela Patrick, Dylan Campbell, Yuki M Asano, Ishan Misra Florian Metze, Christoph Feichtenhofer, Andrea Vedaldi, Jo Henriques, et al. Keeping your eye on the ball: Trajectory attention in video transformers. In NeurIPS, 2021. 2, 3, 6, 7, incorporated herein by reference in its entirety.

[11] Haoqi Fan, Bo Xiong, Karttikeya Mangalam, Yanghao Li, Zhicheng Yan, Jitendra Malik, and Christoph Feichtenhofer. Multiscale vision transformers. In ICCV, 2021. 2, 3, 6, 7, incorporated herein by reference in its entirety.

[12] Dan Kondratyuk, Liangzhe Yuan, Yandong Li, Li Zhang, Mingxing Tan, Matthew Brown, and Boqing Gong. Movinets: Mobile video networks for efficient video recognition. In CVPR, 2021. 2, 6, 7, incorporated herein by reference in its entirety.

[13] Anurag Arnab, Mostafa Dehghani, Georg Heigold, Chen Sun, Mario Lučić, and Cordelia Schmid. Vivit: A video vision transformer. In ICCV, 2021. 1, 2, 3, 5, 6, 7, incorporated herein by reference in its entirety.

[14] Shen Yan, Xuehan Xiong, Anurag Arnab, Zhichao Lu, Mi Zhang, Chen Sun, and Cordelia Schmid. Multiview transformers for video recognition. In CVPR, 2022. 1, 2, 3, 6, 7, incorporated herein by reference in its entirety.

[15] Ze Liu, Jia Ning, Yue Cao, Yixuan Wei, Zheng Zhang, Stephen Lin, and Han Hu. Video swin transformer. In CVPR, 2022. 1, 2, 3, 5, 6, 7, incorporated herein by reference in its entirety.

[16] Yanghao Li, Chao-Yuan Wu, Haoqi Fan, Karttikeya Mangalam, Bo Xiong, Jitendra Malik, and Christoph Feichtenhofer. Mvitv2: Improved multiscale vision transformers for classification and detection. In CVPR, 2022. 2, 5, 6, 7, incorporated herein by reference in its entirety.

[17] Kunchang Li, Yali Wang, Peng Gao, Guanglu Song, Yu Liu, Hongsheng Li, and Yu Qiao. Uniformer: Unified transformer for efficient spatiotemporal representation learning. In ICLR, 2022. 2, 5, 6, 7, incorporated herein by reference in its entirety.

[1] Yanyi Zhang, Xinyu Li, Chunhui Liu, Bing Shuai, Yi Zhu, Biagio Brattoli, Hao Chen, Ivan Marsic, and Joseph Tighe. Vidtr: Video transformer without convolutions. In ICCV, 2021. 2, 3, 6, 7, incorporated herein by reference in its entirety.

(2) Kinetics-600: On the K600 dataset, results for Video-Focal Net-B was reported against recent methods in Table. 2. Compared to the previous state-of-the-art method in MViTv2-B, it was observed that the current invention Video-FocalNet-B achieved 1.2% higher performance. The current invention using the ImageNet-1K initialization also surpassed previous methods pre-trained on the larger ImageNet-21K dataset while maintaining much lower TFLOPS.

TABLE 2

Comparison of the current model with state-of-the-art methods on Kinetics-600 dataset.

| Method | Pre-training | Top-1 |
|---|---|---|
| SlowFast R101-NL (ICCV'19) [6] | ImageNet-21K | 81.8 |
| X3D-XXL (CVPR'20) [7] | ImageNet-21K | 81.9 |
| TimeSformer-L (ICML'21) [9] | ImageNet-21K | 82.2 |
| MFormer-HR (NeurIPS'21) [10] | ImageNet-21K | 82.7 |
| ViViT-L FE (CVPR'21) [13] | ImageNet-21K | 82.9 |
| MTV-B (CVPR'22) [14] | ImageNet-21K | 83.6 |
| MTV-B (320p) (CVPR'22) [14] | ImageNet-21K | 84.0 |
| Video-Swin-B (CVPR'22) [15] | ImageNet-21K | 84.0 |
| Uniformer-B (ICLR'22) [17] | ImageNet-1K | 84.5 |
| MoViNet-A6 (CVPR'21) [12] | ImageNet-21K | 84.8 |
| MViTv1-B (ICCV'21) [11] | None | 83.8 |
| MViTv2-B (CVPR'22) [16] | None | 85.5 |
| Video-FocalNet-B | ImageNet-1K | 86.7 |

(3) Something-Something-v2: On the SS-v2 benchmark results for Video-FocalNet-B was reported and compared against state-of-the-art methods in Table. 3. On this challenging benchmark, it was observed that the current invention again surpassed the previous state-of-the-art method in MViTv2-B and Uniformer-B by 0.6% and 0.7% respectively. The strong performance shows that the method used in the current invention is able to effectively model the subtle temporal changes and dependencies in the challenging dataset.

TABLE 3

Comparison with state-of-the-art methods on Something-Something-v2 dataset

| Method | Pre-training | Top-1 |
|---|---|---|
| SlowFast R50 (ICCV'19) [6] | ImageNet-21K | 61.7 |
| TimeSformer-HR (ICML'21) [9] | ImageNet-21K | 62.5 |
| VidTR (ICCV'21) [18] | ImageNet-21K | 63.0 |
| ViViT-L FE (CVPR'21) [14] | ImageNet-21K | 65.9 |
| MFormer-L (NeurIPS'21) [106] | ImageNet-21K | 68.1 |
| MTV-B (CVPR'22) [14] | ImageNet-21K | 67.6 |
| MTV-B (320p) (CVPR'22) [14] | ImageNet-21K | 68.5 |
| Video-Swin-B (CVPR'22) [15] | Kinetics400 | 69.6 |
| Uniformer-B (ICLR'22) [17] | Kinetics400 | 70.4 |
| MViTv1-B (ICCV'21) [11] | ImageNet-21K | 67.6 |
| MViTv2-B (CVPR'22) [16] | Kinetics400 | 70.5 |
| Video-FocalNet-B | Kinetics400 | 71.1 |

Figure 9:
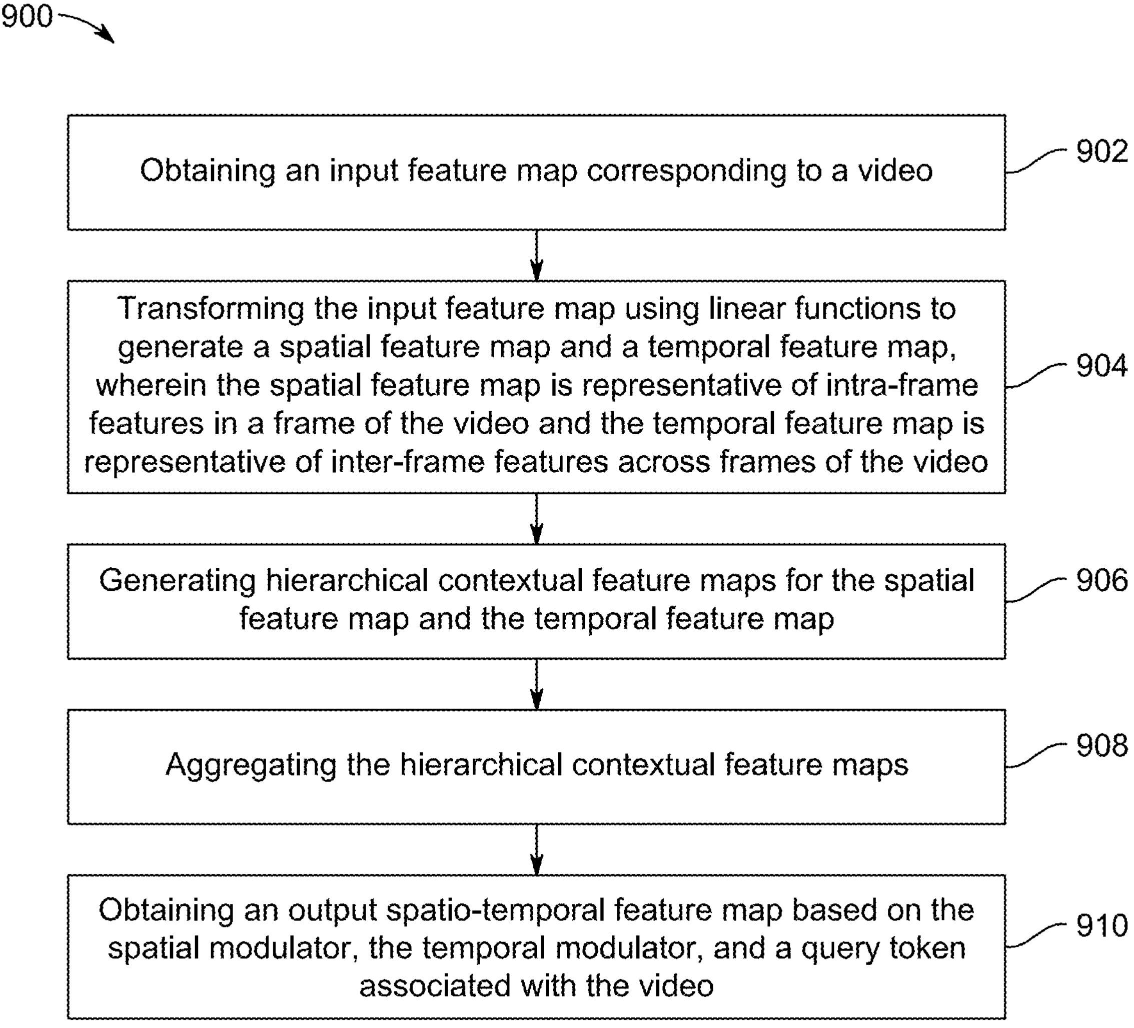
FIG. 9 illustrates a flowchart of a method for modeling local and global spatio-temporal context in a video for video recognition, according to certain embodiments.

FIG. 9 illustrates a flowchart of a method 900 for modeling local and global spatio-temporal context in a video for video recognition, according to an embodiment. The method is performed in the processor 218 as described in FIG. 2. The method 900 is described in conjunction 5 with FIGS. 2-4. Various steps of the method 900 are included through blocks in FIG. 9. One or more blocks may be combined or eliminated to achieve the method for modeling local and global spatio-temporal context in a video for video recognition, without departing from the scope of the present disclosure.

At step 902, the method 900 includes, obtaining an input feature map $X_{st}$ corresponding to a video.

At step 904, the method 900 includes transforming the input feature map ($X_{st}$) using linear functions $f_{z,s}$ and $f_{z,t}$ to generate a spatial feature map $Z_{0s}$ and a temporal feature map $Z_{0t}$, respectively. The spatial feature map $Z_{0s}$ is representative of intra-frame features in a frame of the video and the temporal feature map $Z_{0t}$ is representative of inter-frame features across frames of the video.

At step 906, the method 900 includes generating hierarchical contextual feature maps for the spatial feature map ($Z^l_s$) and the temporal feature ($Z^l_t$). The hierarchical contextual feature maps for the spatial feature map ($Z^l_s$) is generated by applying depth-wise convolutions at multiple levels to the spatial feature map ($Z^l_s$) to generate a level-specific spatial feature map for each level. Also, the hierarchical contextual feature maps for the temporal feature map ($Z^l_t$) is generated by applying point-wise convolutions at multiple levels to the temporal feature map ($Z^l_t$) to generate a level-specific temporal feature map for each level.

At step 908, the method 900 includes aggregating the hierarchical contextual feature maps. Aggregation of the hierarchical contextual feature maps is performed by aggregating the level-specific spatial feature map for the multiple levels using a first set of gating weights $G_s$ to obtain a spatial modulator ($M_s$); and aggregation of the hierarchical contextual feature maps is performed by aggregating the level-specific temporal feature map for the multiple levels using a second set of gating weights $G_t$ to obtain a temporal modulator ($M_t$).

At step 910, the method 900 includes obtaining an output spatio-temporal feature map based on the spatial modulator ($M_s$), the temporal modulator ($M_t$), and a query token associated with the video.

Figure 10:
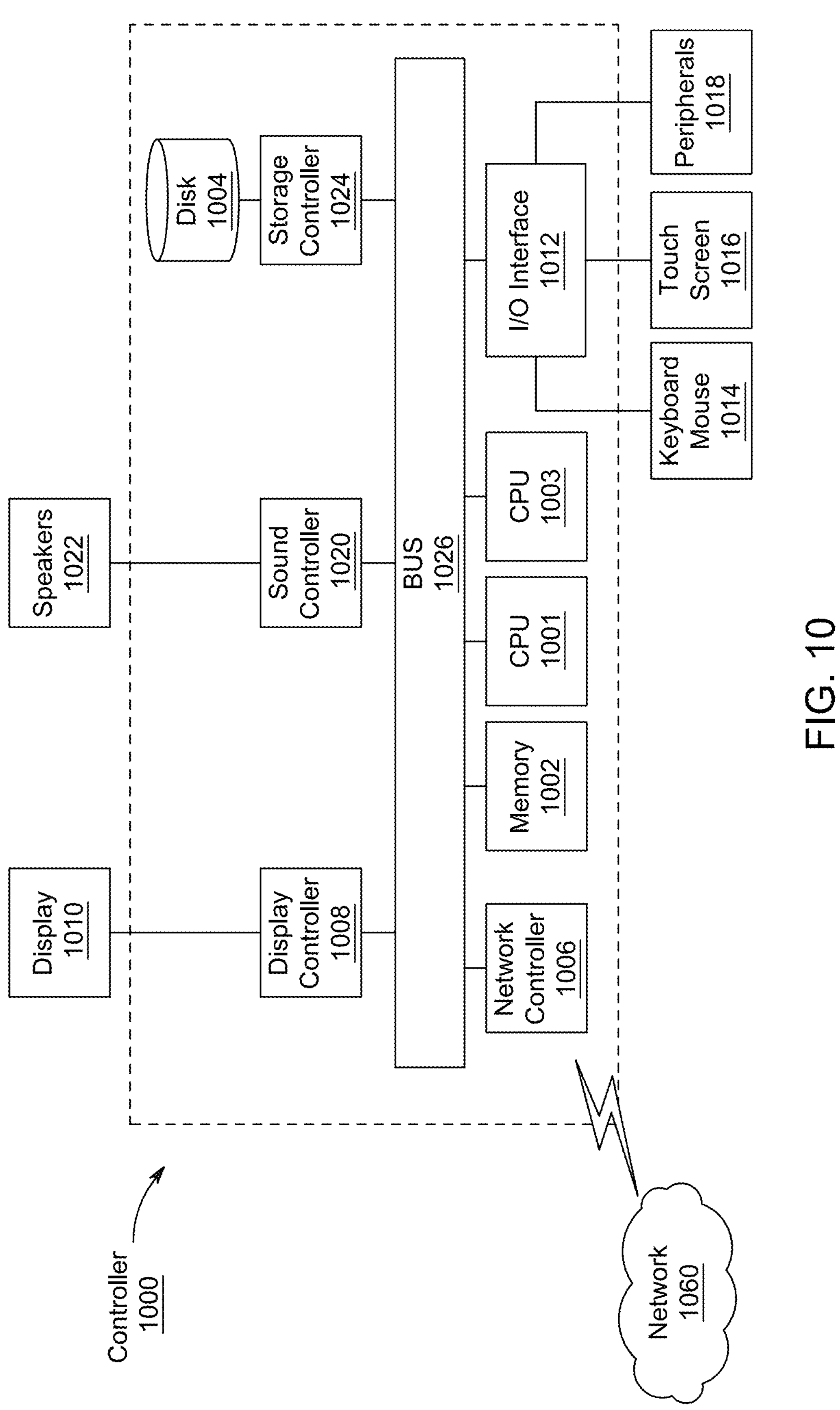
FIG. 10 is an illustration of a non-limiting example of details of computing hardware used in the computing system, according to certain embodiments.

Next, further details of the hardware description of the computing environment according to exemplary embodiments is described with reference to FIG. 10. In FIG. 10, a controller 1000 described is representative of the system 200 configured to model local and global spatio-temporal context in a video for video recognition of FIG. 2 in which the controller 1000 is a computing device which includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, Microsoft Windows 11,UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 703 may be implemented on an FPGA, ASIC, PLD or using discrete logic circuits, as one of ordinary skill in the art would recognize. Further, CPU 1001, 703 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 1008, such as a NVIDIA GeForce GTX or Quadro graphics adaptor from NVIDIA Corporation of America for interfacing with display 710, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general-purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
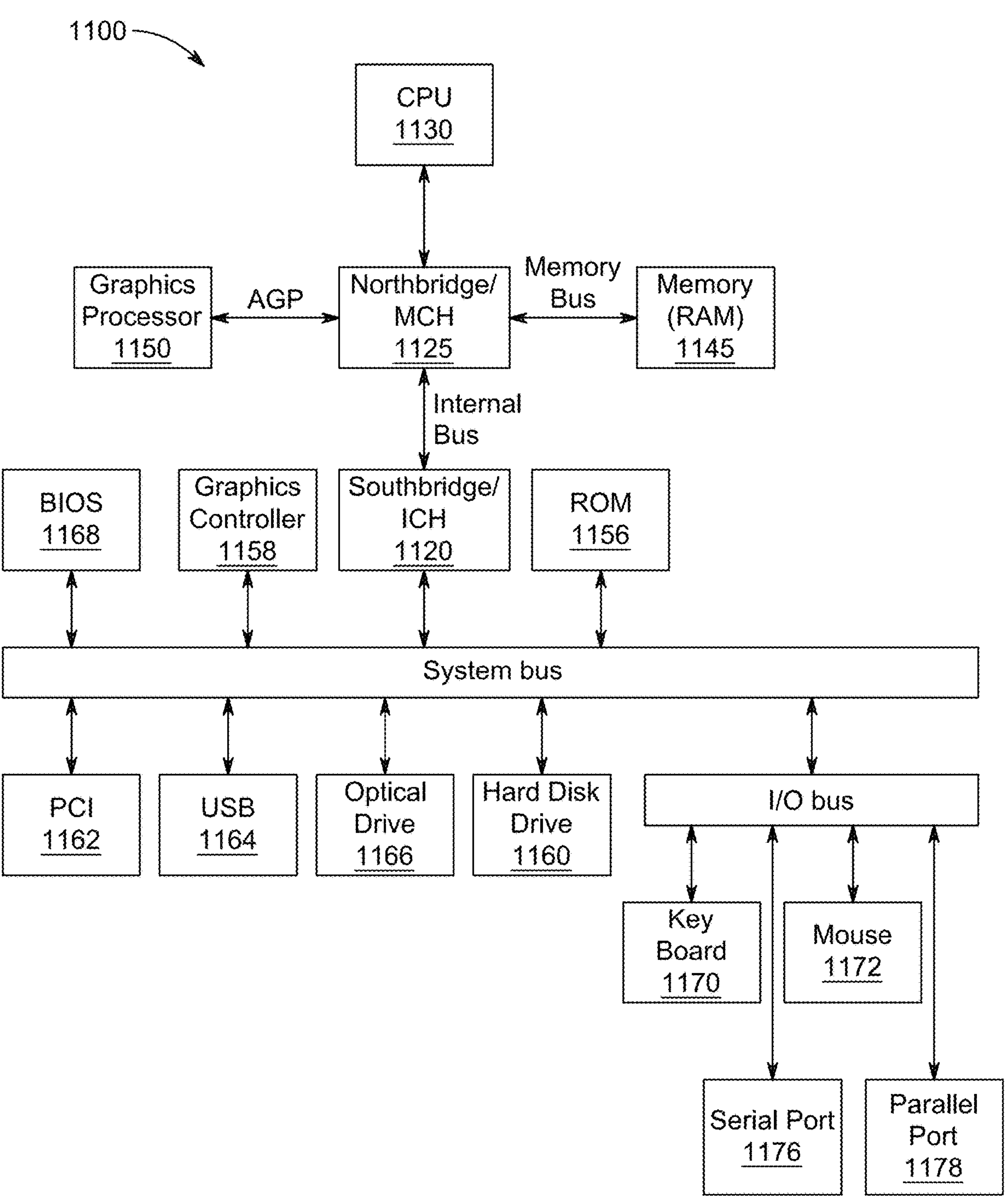
FIG. 11 is an exemplary schematic diagram of a data processing system used within the computing system, according to certain embodiments.

FIG. 11 shows a schematic diagram of a data processing system 1100, according to certain embodiments, for performing the functions of the exemplary embodiments. The data processing system 1100 is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
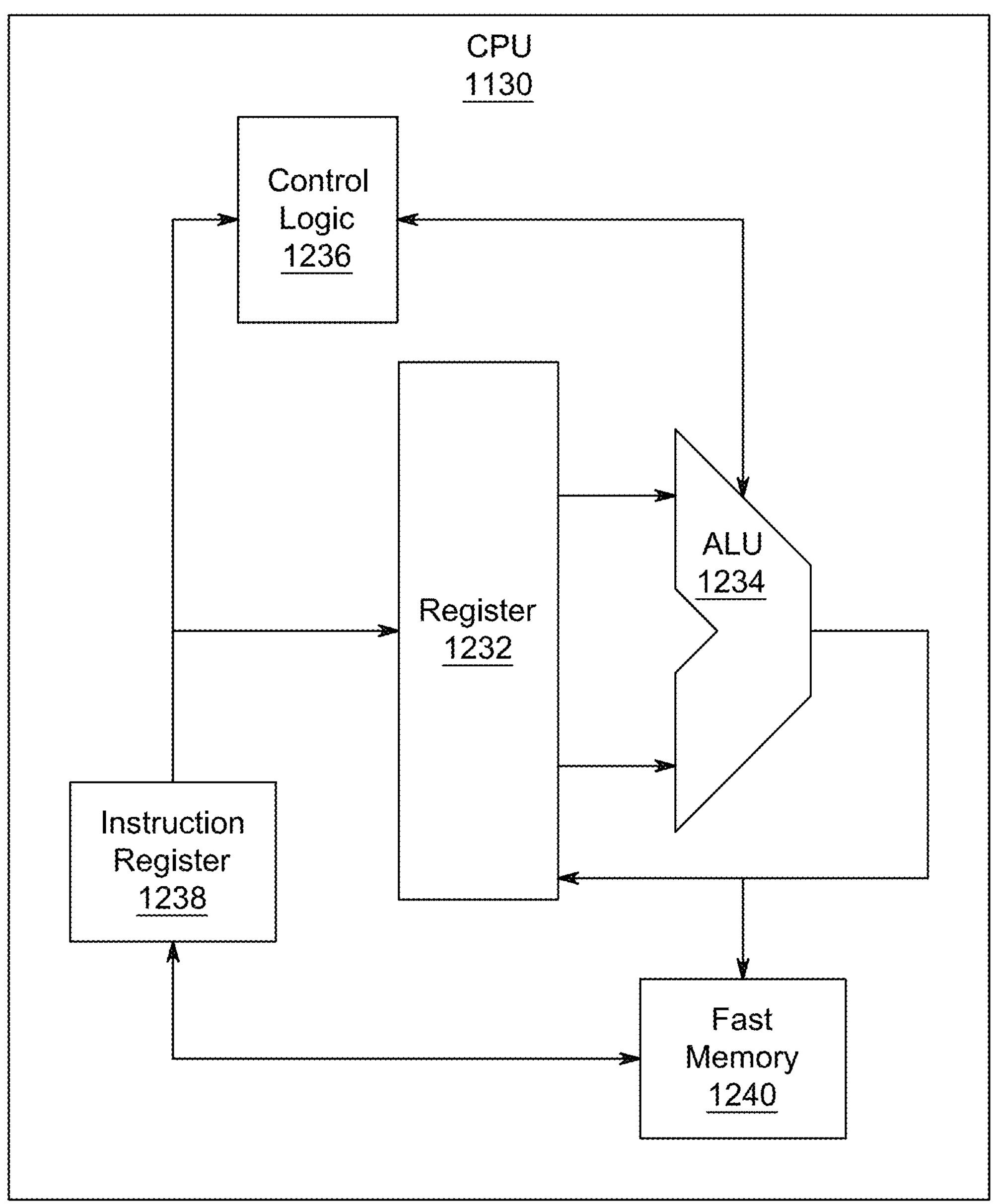
FIG. 12 is an exemplary schematic diagram of a processor used with the computing system, according to certain embodiments.

For example, FIG. 12 shows one implementation of CPU 1130, according to an embodiment. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1232 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 888 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
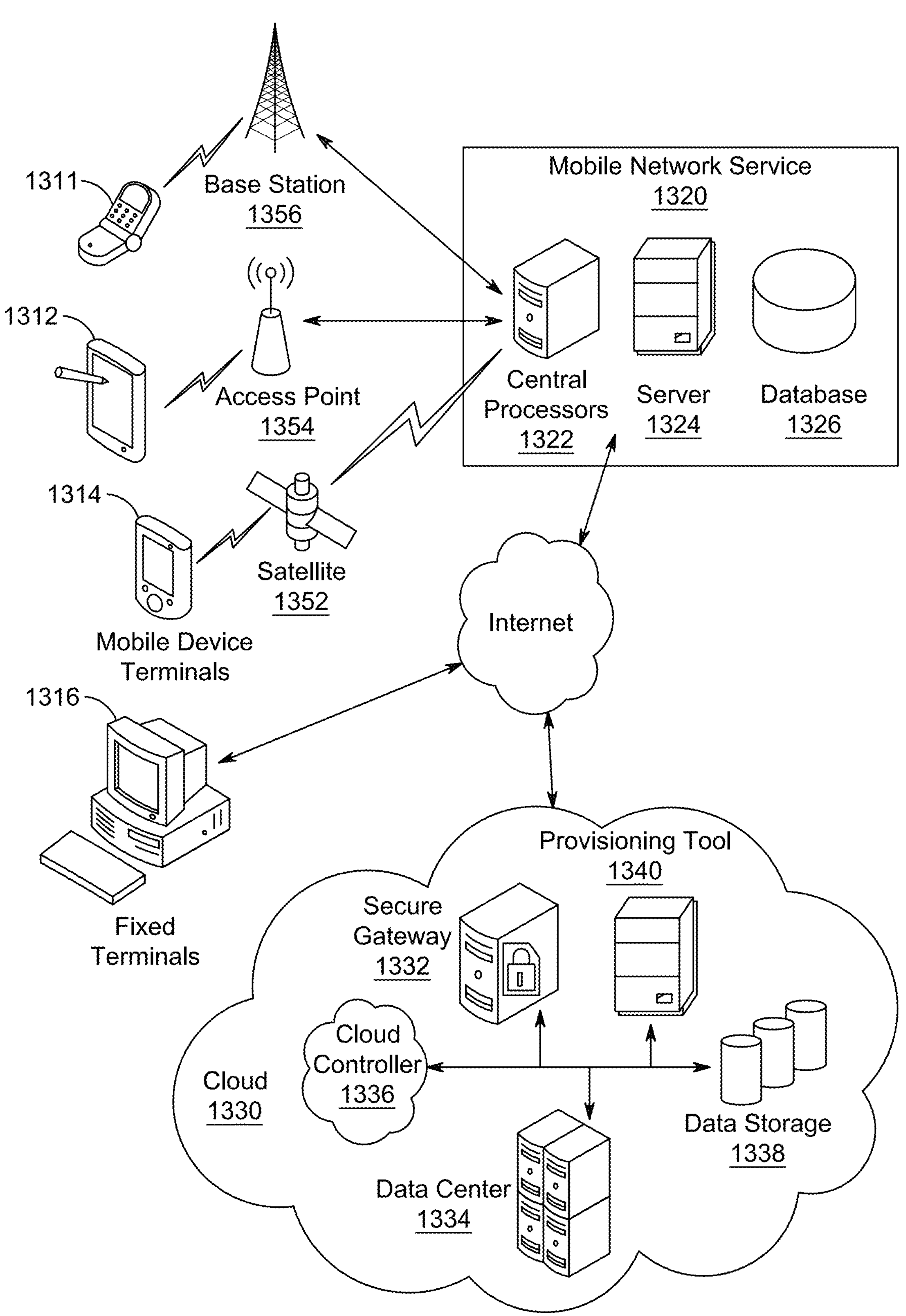
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for modeling local and global spatio-temporal context in a video for video recognition, the method comprising:

obtaining an input feature map corresponding to a video;

transforming the input feature map using linear functions to generate a spatial feature map and a temporal feature map, wherein the spatial feature map is representative of intra-frame features in a frame of the video and the temporal feature map is representative of inter-frame features across frames of the video;

generating hierarchical contextual feature maps for the spatial feature map and the temporal feature map by applying:

depth-wise convolutions at multiple levels to the spatial feature map to generate a level-specific spatial feature map for each level, and point-wise convolutions at multiple levels to the temporal feature map to generate a level-specific temporal feature map for each level;

aggregating the hierarchical contextual feature maps by:

aggregating the level-specific spatial feature map for the multiple levels using a first set of gating weights to obtain a spatial modulator, and aggregating the level-specific temporal feature map for the multiple levels using a second set of gating weights to obtain a temporal modulator; and obtaining an output spatio-temporal feature map based on the spatial modulator, the temporal modulator, and a query token associated with the video.

2. The method of claim 1, wherein the depth-wise convolutions and the point-wise convolutions are implemented using a GeLU activation function.

3. The method of claim 1, wherein generating the hierarchical contextual feature maps includes:

performing a global-pooling operation on the level-specific spatial feature map corresponding to the highest level of the multiple levels to obtain a top-level spatial feature map, and performing the global-pooling operation on the level-specific temporal feature map corresponding to the highest level to obtain a top-level temporal feature map, wherein the top-level spatial feature map and the top-level temporal feature map are representative of a global context of the video.

4. The method of claim 1, wherein aggregating the hierarchical contextual feature maps includes:

obtaining a dot product of the first set of gating weights and the level-specific spatial feature map corresponding to each level to generate a first set of dot products, wherein the first set of dot products includes a dot product of an additional level-specific spatial feature map and the first set of gating weights corresponding to a level above the multiple levels, aggregating the first set of dot products to obtain an aggregated spatial feature map, and applying a first linear function to the aggregated spatial feature map to obtain the spatial modulator.

5. The method of claim 1, wherein aggregating the hierarchical contextual feature maps includes:

obtaining a dot product of the second set of gating weights and the level-specific temporal feature map corresponding to each level to generate a second set of dot products, wherein the second set of dot products includes a dot product of an additional level-specific temporal feature map and the second set of gating weights corresponding to a level above the multiple levels, aggregating the second set of dot products to obtain an aggregated temporal feature map, and applying a second linear function to the aggregated temporal feature map to obtain the temporal modulator.

6. The method of claim 1, wherein obtaining the output spatio-temporal feature map includes:

performing an element-wise multiplication between the query token, the spatial modulator and the temporal modulator.

7. The method of claim 1, wherein the query token is obtained by applying a linear function to the input feature map.

8. The method of claim 1 further comprising:

executing a video recognition model using the output spatio-temporal feature map to classify the video into a specified classification.

9. A method for modeling local and global spatio-temporal context in a video for video recognition, the method comprising:

obtaining a spatial feature map and a temporal feature map for a video;

generating hierarchical contextual feature maps based on the spatial feature map and the temporal feature map that represent a context of the video at multiple levels of granularity;

aggregating the hierarchical contextual feature maps based on gating weights to obtain a spatial modulator and a temporal modulator that are representative of an aggregated context across the multiple levels; and obtaining an output spatio-temporal feature map based on the spatial modulator, the temporal modulator and a query token associated with the video.

10. The method of claim 9, wherein generating and aggregating the hierarchical contextual feature maps for the spatial feature map is performed independent of generating and aggregating the hierarchical contextual feature maps for the temporal feature map.

11. The method of claim 9, wherein generating the hierarchical contextual feature maps includes:

applying depth-wise convolutions at different levels to the spatial feature map to generate a level-specific spatial feature map for each level, and applying point-wise convolutions at different levels to the temporal feature map to generate a level-specific temporal feature map for each level.

12. The method of claim 11 further comprising:

performing a global-pooling operation on the level-specific spatial feature map corresponding to the highest level of the multiple levels to obtain a top-level spatial feature map, and performing the global-pooling operation on the level-specific temporal feature map corresponding to the highest level to obtain a top-level temporal feature map, wherein the top-level spatial feature map and the top-level temporal feature map are representative of a global context of the video.

13. The method of claim 11, wherein aggregating the hierarchical contextual feature maps includes:

aggregating the level-specific spatial feature maps using a first set of gating weights to obtain the spatial modulator, and aggregating the level-specific temporal feature maps using a second set of gating weights to obtain a temporal modulator.

14. The method of claim 13, wherein aggregating the hierarchical contextual feature maps includes:

obtaining a dot product of the first set of gating weights and the level-specific spatial feature map corresponding to each level to generate a first set of dot products, aggregating the first set of dot products to obtain an aggregated spatial feature map, and applying a first linear function to the aggregated spatial feature map to obtain the spatial modulator.

15. The method of claim 14, wherein the first set of dot products includes a dot product of a top-level spatial feature map and the first set of gating weights corresponding to a level above the multiple levels.

16. The method of claim 13, wherein aggregating the hierarchical contextual feature maps includes:

obtaining a dot product of the second set of gating weights and the level-specific temporal feature map corresponding to each level to generate a second set of dot products, aggregating the second set of dot products to obtain an aggregated temporal feature map, and applying a second linear function to the aggregated temporal feature map to obtain the temporal modulator.

17. The method of claim 16, wherein the second set of dot products includes a dot product of a top-level temporal feature map and the second set of gating weights corresponding to a level above the multiple levels.

18. The method of claim 9, wherein obtaining the output spatio-temporal feature map includes:

performing an element-wise multiplication between the query token, the spatial modulator and the temporal modulator.

19. The method of claim 9, wherein the spatial feature map is generated by transforming an input feature map corresponding to the video using a first linear function, and wherein the temporal feature map by transforming the input feature map using a second linear function.

20. A system comprising:

a memory storing set of instructions; and a processor configured to execute the set of instructions to cause the system to perform a method of:

obtaining a spatial feature map and a temporal feature map for a video;

generating hierarchical contextual feature maps based on the spatial feature map and the temporal feature map that represent a context of the video at multiple levels of granularity;

aggregating the hierarchical contextual feature maps based on gating weights to obtain a spatial modulator and a temporal modulator that are representative of an aggregated context across the multiple levels; and obtaining an output spatio-temporal feature map based on the spatial modulator, the temporal modulator and a query token associated with the video.

* * * * *